United States Patent
Nakashima et al.

(10) Patent No.: US 11,273,820 B2
(45) Date of Patent: Mar. 15, 2022

(54) HYBRID VEHICLE

(71) Applicant: TOYOTA JIDOSHA KABUSHIKI KAISHA, Toyota (JP)

(72) Inventors: Yoichi Nakashima, Toyota (JP); Toshiya Yamashita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/302,653

(22) Filed: May 10, 2021

(65) Prior Publication Data

US 2021/0370911 A1 Dec. 2, 2021

(30) Foreign Application Priority Data

May 29, 2020 (JP) .............................. JP2020-095031

(51) Int. Cl.
*B60W 20/40* (2016.01)
*B60W 10/08* (2006.01)
(Continued)

(52) U.S. Cl.
CPC ............ *B60W 20/40* (2013.01); *B60W 10/02* (2013.01); *B60W 10/06* (2013.01); *B60W 10/08* (2013.01);
(Continued)

(58) Field of Classification Search
CPC ...... B60W 10/02; B60W 20/40; B60W 10/06; B60W 10/08; B60W 2510/0638; B60W 2510/0676; B60W 2510/085; B60W 2710/021; B60W 2510/107; B60W 2510/00657; B60W 20/17;
(Continued)

(56) References Cited

U.S. PATENT DOCUMENTS

| 2011/0053734 A1* | 3/2011 | Kaltenbach | ........... B60W 10/02 477/5 |
| 2014/0352492 A1* | 12/2014 | Nefcy | ..................... F16F 15/12 74/7 C |

(Continued)

FOREIGN PATENT DOCUMENTS

JP 2014-201279 A 10/2014

*Primary Examiner* — Roger L Pang
(74) *Attorney, Agent, or Firm* — Oblon, McClelland, Maier & Neustadt, L.L.P.

(57) ABSTRACT

A hybrid vehicle includes a connecting/disconnecting clutch disposed between an engine and an electric motor, an automatic transmission including an input clutch, a starting clutch disposed between the electric motor and the automatic transmission, and a control apparatus for executing an engine-start control operation for starting the engine, by igniting the engine after increasing a rotational speed of the engine by a torque of the electric motor while placing the connecting/disconnecting clutch into an engaged state. In process of the engine-start control operation that is executed when the hybrid vehicle is in a stopped state with the starting clutch being in a released state, the control apparatus places the input clutch in an engaged state until the rotational speed of the engine exceeds a predetermined speed value, and switches the input clutch to a released state after the rotational speed of the engine has exceeded the predetermined speed value.

9 Claims, 5 Drawing Sheets

(51) Int. Cl.
  *B60W 10/06*   (2006.01)
  *B60W 20/17*   (2016.01)
  *B60W 10/02*   (2006.01)
  *B60W 30/20*   (2006.01)

(52) U.S. Cl.
  CPC ....... *B60W 20/17* (2016.01); *B60W 2030/203* (2013.01); *B60W 2030/206* (2013.01); *B60W 2510/0216* (2013.01); *B60W 2510/0638* (2013.01); *B60W 2510/0657* (2013.01); *B60W 2510/0676* (2013.01); *B60W 2510/085* (2013.01); *B60W 2510/107* (2013.01); *B60W 2510/244* (2013.01); *B60W 2710/021* (2013.01)

(58) Field of Classification Search
  CPC ..... B60W 2030/203; B60W 2030/206; B60W 2510/244
  USPC .......................................................... 477/5
  See application file for complete search history.

(56) References Cited

U.S. PATENT DOCUMENTS

| | | | | |
|---|---|---|---|---|
| 2015/0336570 | A1* | 11/2015 | Sugimura | B60W 10/08 701/22 |
| 2018/0180011 | A1* | 6/2018 | Stalfors | B60W 10/11 |
| 2018/0362020 | A1* | 12/2018 | Kobler | B60W 10/02 |

* cited by examiner

HYBRID VEHICLE

This application claims priority from Japanese Patent Application No. 2020-095031 filed on May 29, 2020, the disclosure of which is herein incorporated by reference in its entirety.

FIELD OF THE INVENTION

The present invention relates to a hybrid vehicle including an engine, an electric motor, a connecting/disconnecting clutch for cutting off connection between the engine and the electric motor, an automatic transmission including an input clutch, and a control apparatus for executing an engine-start control operation.

BACKGROUND OF THE INVENTION

There is well-known a hybrid vehicle including: (a) an engine; (b) drive wheels; (c) an electric motor connected to a power transmission path between the engine and the drive wheels, in a power transmittable manner; (d) a connecting/disconnecting clutch disposed in the power transmission path, and configured, when being in a released state, to cut off connection between the engine and the electric motor; (e) a damper disposed between the engine and the connecting/disconnecting clutch in the power transmission path; (f) an automatic transmission constituting a part of the power transmission path, and including an input rotary member and an input clutch connected to the input rotary member; and (g) a control apparatus configured to execute an engine-start control operation for starting the engine so as to start the engine and cause the engine to be self-rotated, by igniting the engine after increasing a rotational speed of the engine by causing the electric motor to output a torque while controlling the connecting/disconnecting clutch to place the connecting/disconnecting clutch into an engaged state. A hybrid vehicle is disclosed in JP 2014-201279A is an example of such a hybrid vehicle. This Japanese Patent Application Publication teaches that, when the engine is to be started, the engine is caused to be self-rotated, by injecting a fuel and igniting the engine, for example, with the connecting/disconnecting clutch being placed in its fully engaged state, after increasing the rotational speed of the engine to a speed value lower than a resonance rotational speed of a drive system including the damper in a slipped state of the connecting/disconnecting clutch, by causing the electric motor to output a torque while controlling the connecting/disconnecting clutch to place the connecting/disconnecting clutch into the engaged state.

SUMMARY OF THE INVENTION

By the way, the hybrid vehicle disclosed in the above-identified Japanese Patent Application Publication is provided with a torque converter which is provided between the electric motor and the automatic transmission in the power transmission path and is configured to transmit a drive power of the engine and/or a drive power of the electric motor. It might be possible to replace such a torque converter with a wet starting clutch that is to be switched from a released state to an engaged state via a slipped state when the hybrid vehicle is to be started to run during operation of the engine. In a wet frictional engagement device such as this starting clutch, a drag torque is generated when the engagement device is in a released state, so that an output-side member of the starting clutch is likely to be dragged and rotated by an input-side member of the starting clutch that is rotated integrally with the electric motor in execution of the engine-start control operation, if the drag torque of the starting clutch is large. Therefore, in execution of the engine-start control operation, an input-side member of the input clutch, which is connected to an input rotary member of the automatic transmission, also could be rotated as well as the starting clutch together with the electric motor, in spite of the released state of the starting clutch. In this case, the resonance rotational speed of the drive system including the damper is made lower than in a case in which the input-side member of the starting clutch is rotated together with the electric motor, without the input-side member of the input clutch being rotated together with the electric motor, when the starting clutch is in the released state. With the resonance rotational speed of the drive system being made lower, there is a risk that start of the engine could be made difficult due to generation of resonance of the drive system when the rotational speed of the engine is being increased by the electric motor in process of the engine-start control operation, or there is a risk that start of the engine could be made difficult because the engine rotational speed is not smoothly increased after an initial explosion of the engine due to generation of resonance of the drive system in process of the engine-start control operation.

The present invention was made in view of the background art described above. It is therefore an object of the present invention to provide a hybrid vehicle capable of improving a startability of an engine in an engine-start control operation that is be executed with a starting clutch being in a released state when the vehicle is being stopped.

The object indicated above is achieved according to the following aspects of the present invention.

According to a first aspect of the invention, there is provided a hybrid vehicle comprising: (a) an engine; (b) drive wheels; (c) an electric motor connected to a power transmission path between the engine and the drive wheels, in a power transmittable manner; (d) a connecting/disconnecting clutch disposed in the power transmission path, and configured, when being in a released state, to cut off connection between the engine and the electric motor; (e) a damper disposed between the engine and the connecting/disconnecting clutch in the power transmission path; (f) an automatic transmission constituting a part of the power transmission path, and including an input rotary member and an input clutch connected to the input rotary member; (g) a control apparatus configured to execute an engine-start control operation for starting the engine so as to cause the engine to be self-rotated, by igniting the engine after increasing a rotational speed of the engine by causing the electric motor to output a torque while controlling the connecting/disconnecting clutch to place the connecting/disconnecting clutch into an engaged state; and (h) a wet starting clutch disposed between the electric motor and the automatic transmission in the power transmission path, wherein, in process of the engine-start control operation that is executed when the hybrid vehicle is in a stopped state with the starting clutch being in a released state, the control apparatus is configured to place the input clutch in an engaged state until the rotational speed of the engine exceeds a predetermined speed value, and to switch the input clutch to a released state after the rotational speed of the engine has exceeded the predetermined speed value.

According to a second aspect of the invention, in the hybrid vehicle according to the first aspect of the invention, the predetermined speed value is an average speed value between a first resonance rotational speed and a second resonance rotational speed, or a speed value in vicinity of the average speed value, wherein the first resonance rotational speed is a resonance rotational speed of a drive system including the damper in a state in which an input-side member of the starting clutch connected to the electric motor is rotated integrally with the electric motor, and wherein the second resonance rotational speed is lower than the first resonance rotational speed, and is the resonance rotational speed of the drive system in a state in which an input-side member of the input clutch as well as the starting clutch is rotated integrally with the electric motor.

According to a third aspect of the invention, in the hybrid vehicle according to the first or second aspect of the invention, the input clutch a wet frictional engagement device, wherein the starting clutch and the input clutch are constructed such that a drag torque of the starting clutch in the released state of the starting clutch is larger than a drag torque of the input clutch in the released state of the input clutch.

According to a fourth aspect of the invention, in the hybrid vehicle according to any one of the first through third aspects of the invention, in a case in which the input clutch is placed in the released state when the engine-start control operation is executed with the hybrid vehicle being in the stopped state and with the starting clutch being in the released state, the control apparatus is configured to start execution of the engine-start control operation after switching the input clutch to the engaged state, and to cause the engine to be self-rotated, by igniting the engine after increasing the rotational speed of the engine, by the electric motor, to a predetermined starting speed value that is lower than the predetermined speed value, and then switch the input clutch to the released state when the rotational speed of the engine has exceeded the predetermined speed value.

According to a fifth aspect of the invention, in the hybrid vehicle according to the fourth aspect of the invention, the case in which the input clutch is placed in the released state is a case in which the automatic transmission is placed in a non-driving position whereby a power is not transmittable through the automatic transmission.

According to a sixth aspect of the invention, in the hybrid vehicle according to any one of the first through fifth aspects of the invention, in a case in which a temperature of a working fluid used for lubrication of the starting clutch is not higher than a predetermined temperature value, the control apparatus is configured to execute the engine-start control operation in which the input clutch is placed in the engaged state until the rotational speed of the engine exceeds the predetermined speed value, wherein the predetermined temperature value is a predetermined threshold value for determining that, when the temperature of the working fluid is not higher than the predetermined temperature value, the temperature of the working fluid is so low that a viscosity of the working fluid is increased to such a degree that an output-side member of the starting clutch is to be rotated together with the input-side member of the starting clutch, with the starting clutch being in the released state and with the input clutch being in the released state.

According to a seventh aspect of the invention, in the hybrid vehicle according to any one of the first through sixth aspects of the invention, there is further provided an electric storage device configured to supply and receive an electric power to and from the electric motor, wherein, in a case in which a maximum electric power that is outputtable from the electric storage device is not larger than a predetermined value, the control apparatus is configured to execute the engine-start control operation in which the input clutch is placed in the engaged state until the rotational speed of the engine exceeds the predetermined speed value, and wherein the predetermined value is a predetermined threshold value for determining that, when the maximum electric power is not larger than the predetermined value, the electric power outputtable from the electric storage device is so limited that an output torque of the electric motor is insufficient to increase the rotational speed of the engine for suppressing resonance of a drive system including the damper, which is to be generated due to the damper in process of the engine-start control operation.

According to an eighth aspect of the invention, in the hybrid vehicle according to any one of the first through seventh aspects of the invention, in a case in which a temperature of a coolant water of the engine is not higher than a predetermined temperature value, the control apparatus is configured to execute the engine-start control operation in which the input clutch is placed in the engaged state until the rotational speed of the engine exceeds the predetermined speed value, wherein the predetermined temperature value is a predetermined threshold value for determining that, when the temperature of the coolant water is not higher than the predetermined temperature value, the temperature of the working fluid is so low that a sliding torque of the engine upon rotation of the engine is increased to such a degree that makes the rotational speed of the engine difficult to be increased for suppressing resonance of a drive system including the damper, which is to be generated due to the damper in process of the engine-start control operation.

According to a ninth aspect of the invention, in the hybrid vehicle according to any one of the first through eighth aspects of the invention, in a case in which a change rate of the rotational speed of the engine is not higher than a predetermined rate value in process of the engine-start control operation, the control apparatus is configured to place the input clutch in the engaged state until the rotational speed of the engine exceeds the predetermined speed value, wherein the predetermined rate value is a predetermined threshold value for determining that, when the change rate of the rotational speed of the engine is not higher than the predetermined rate value, the change rate of the rotational speed of the engine is so low that an output torque of the electric motor is estimated to be insufficient to increase the rotational speed of the engine for suppressing resonance of a drive system including the damper, which is to be generated due to the damper in the process of the engine-start control operation.

In the hybrid vehicle according to the first aspect of the invention, in process of the engine-start control operation that is executed when the hybrid vehicle is in the stopped state with the starting clutch being in the released state, the input clutch is placed in the engaged state until the rotational speed of the engine exceeds the predetermined speed value, whereby the output-side member of the starting clutch is made difficult to be dragged and rotated by the input-side member of the starting clutch that is rotated integrally with the electric motor, so that the input-side member of the starting clutch is rotated together with the electric motor, without the output-side member of the starting clutch being rotated together with the electric motor. Further, the input clutch is switched to the released state after the rotational speed of the engine has exceeded the predetermined speed value, whereby the output-side member of the starting clutch is made easy to be dragged and rotated by the input-side member of the starting clutch, so that the input-side member of the input clutch as well as the starting clutch is likely to be rotated integrally with the electric motor. Therefore, the resonance rotational speed of the drive system is made relatively high in a stage after start of the execution of the engine-start control operation until the rotational speed of the engine exceeds the predetermined speed value, and is made relatively low in a stage after the rotational speed of the engine has exceeded the predetermined speed value. That is, by switching the input clutch from the engaged state to the released state, depending on change of the rotational speed of the engine in process of the engine-start control operation, a high state in which the resonance rotational speed of the drive system is relatively high, is switched to a low state in which the resonance rotational speed of the drive system is relatively low. Owing to the arrangement, in process of the engine-start control operation, the rotational speed of the engine is made difficult to pass through the resonance rotational speed of the drive system or a rotational speed region that is in vicinity of the resonance rotational speed, whereby generation of resonance of the drive system can be suppressed. Therefore, it is possible to improve startability of the engine in the engine-start control operation that is executed when the vehicle is in the stopped state with the starting clutch being in the released state.

There is a risk of increase of NV if the resonance of the drive system occurs. The NV is a generic term including, for example, noise generated in the vehicle and vibration sensible by a driver and passengers in the vehicle. In the hybrid vehicle according to the first aspect of the invention, in the engine-start control operation that is executed when the hybrid vehicle is in the stopped state with the starting clutch being in the released state, the occurrence of the resonance of the drive system can be suppressed, so that it is possible to obtain also a sub-effect that is to suppress the increase of the NV such as reduction of quietness, for example.

In the hybrid vehicle according to the second aspect of the invention, the predetermined speed value is the average speed value between the first resonance rotational speed and the second resonance rotational speed, or the speed value in vicinity of the average speed value, wherein the first resonance rotational speed is a resonance rotational speed of the drive system in the state in which an input-side member of the starting clutch connected to the electric motor is rotated integrally with the electric motor, and wherein the second resonance rotational speed is lower than the first resonance rotational speed, and is the resonance rotational speed of the drive system in the state in which the input-side member of the input clutch as well as the starting clutch is rotated integrally with the electric motor. Thus, in the stage after start of the execution of the engine-start control operation until the rotational speed of the engine exceeds the predetermined speed value, the resonance rotational speed of the drive system is the first resonance rotational speed that is higher than the predetermined speed value. In the stage after the rotational speed of the engine has exceeded the predetermined speed value, the resonance rotational speed of the drive system is the second resonance rotational speed that is lower than the predetermined speed value. Owing to the arrangement, in process of the engine-start control operation, the rotational speed of the engine is made difficult to pass through the resonance rotational speed of the drive system or the rotational speed region that is in vicinity of the resonance rotational speed, whereby generation of resonance of the drive system can be suppressed.

In the hybrid vehicle according to the third aspect of the invention, the starting clutch and the input clutch are constructed such that the drag torque of the starting clutch in the released state of the starting clutch is larger than the drag torque of the input clutch in the released state of the input clutch. Thus, in execution of the engine-start control operation, there could be easily caused a phenomenon that even the input-side member of the input clutch as well as the starting clutch is rotated integrally with the electric motor, in spite of the released state of the starting clutch, so that the control arrangement in which the input clutch is placed in the engaged state until the rotational speed of the engine exceeds the predetermined speed value, is useful.

In the hybrid vehicle according to the fourth aspect of the invention, in a case in which the input clutch is placed in the released state when the engine-start control operation is executed with the hybrid vehicle being in the stopped state and with the starting clutch being in the released state, the control apparatus is configured to start execution of the engine-start control operation after switching the input clutch to the engaged state, and to cause the engine to be self-rotated, by igniting the engine after increasing the rotational speed of the engine, by the electric motor, to the predetermined starting speed value that is lower than the predetermined speed value, and then switch the input clutch to the released state when the rotational speed of the engine has exceeded the predetermined speed value. Thus, the resonance rotational speed of the drive system is made relatively high in the stage after start of the execution of the engine-start control operation until the rotational speed of the engine is caused to exceed the predetermined speed value by self-rotation of the engine after the rotational speed of the engine has been increased by the electric motor. Then, the resonance rotational speed of the drive system is made relatively low in the stage after the rotational speed of the engine has exceeded the predetermined speed value. Owing to the arrangement, in process of the engine-start control operation, the rotational speed of the engine is made difficult to pass through the resonance rotational speed of the drive system or a rotational speed region that is in vicinity of the resonance rotational speed, whereby generation of resonance of the drive system can be suppressed. Therefore, it is possible to improve startability of the engine in the engine-start control operation that is executed when the vehicle is in the stopped state with the starting clutch being in the released state.

In the hybrid vehicle according to the fifth aspect of the invention, the case in which the input clutch is placed in the released state is the case in which the automatic transmission is placed in a non-driving position whereby a power is not transmittable through the automatic transmission. Thus, the startability of the engine can be improved in the engine-start control operation that is executed when the hybrid vehicle is in the stopped state with the starting clutch being in the released state.

In the hybrid vehicle according to the sixth aspect of the invention, in the case in which the temperature of the working fluid used for lubrication of the starting clutch is not higher than the predetermined temperature value, namely, in which the viscosity of the working fluid is high, the control apparatus is configured to execute the engine-start control operation in which the input clutch is placed in the engaged state until the rotational speed of the engine exceeds the predetermined speed value. Owing to the arrangement, when the engine-start control operation is executed with the starting clutch being in the released state and with the input clutch being in the released state, it is possible to suppress the resonance of the drive system which is likely to be caused when the input-side member of the input clutch as well as the starting clutch is rotated integrally with the electric motor and accordingly the resonance rotational speed of the drive system is made low.

In the hybrid vehicle according to the seventh aspect of the invention, in the case in which the maximum electric power that is outputtable from the electric storage device is not larger than the predetermined value, namely, in which the output torque of the electric motor is insufficient to increase the rotational speed of the engine for suppressing resonance of the drive system, the control apparatus is configured to execute the engine-start control operation in which the input clutch is placed in the engaged state until the rotational speed of the engine exceeds the predetermined speed value. Owing to the arrangement, it is possible to avoid a situation in which the rotational speed of the engine cannot be quickly increased due to the resonance of the drive system which is likely to be caused when the resonance rotational speed of the drive system is relatively low, namely, a situation in which the engine is made difficult to be started.

In the hybrid vehicle according to the eighth aspect of the invention, in the case in which the temperature of the coolant water of the engine is not higher than the predetermined temperature value, namely, in which the sliding torque of the engine upon rotation of the engine is increased to such a degree that makes the rotational speed of the engine difficult to be increased for suppressing resonance of the drive system, the control apparatus is configured to execute the engine-start control operation in which the input clutch is placed in the engaged state until the rotational speed of the engine exceeds the predetermined speed value. Owing to the arrangement, it is possible to avoid a situation in which the rotational speed of the engine cannot be quickly increased due to the resonance of the drive system which is likely to be caused when the resonance rotational speed of the drive system is relatively low, namely, a situation in which the engine is made difficult to be started.

In the hybrid vehicle according to the ninth aspect of the invention, in the case in which the change rate of the rotational speed of the engine is not higher than the predetermined rate value in process of the engine-start control operation, namely, in which the change rate of the rotational speed of the engine is so low that the output torque of the electric motor is estimated to be insufficient to increase the rotational speed of the engine for suppressing resonance of the drive system, the control apparatus is configured to execute the engine-start control operation in which the input clutch is placed in the engaged state until the rotational speed of the engine exceeds the predetermined speed value. Owing to the arrangement, it is possible to avoid a situation in which the rotational speed of the engine cannot be quickly increased due to the resonance of the drive system which is likely to be caused when the resonance rotational speed of the drive system is relatively low, namely, a situation in which the engine is made difficult to be started.

DETAILED DESCRIPTION OF PREFERRED EMBODIMENTS

Hereinafter, preferred embodiments of the invention will be described in detail with reference to the accompanying drawings.

First Embodiment

Figure 1:
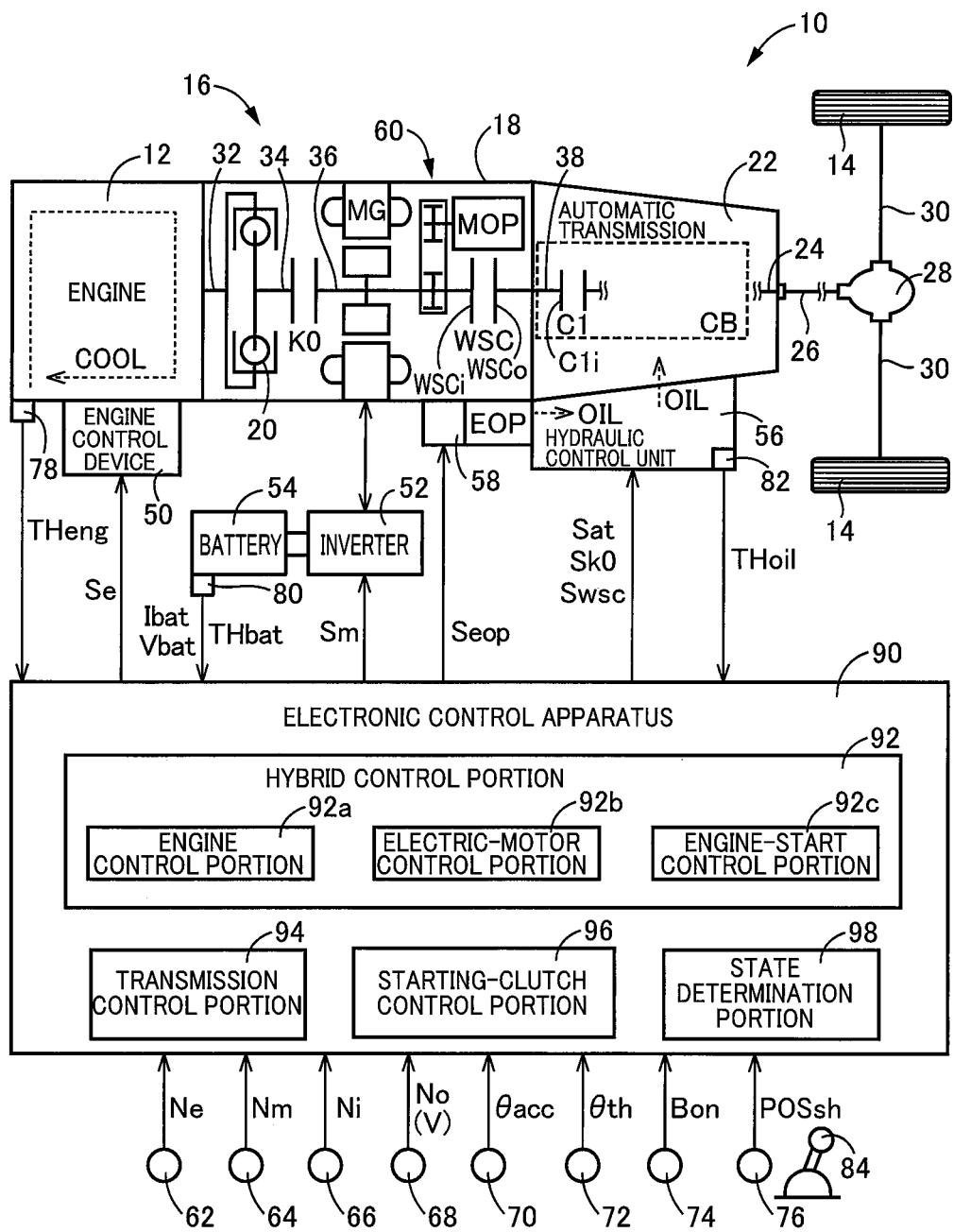
FIG. 1 is a view schematically showing a construction of a hybrid vehicle to which the present invention is applied, for explaining major portions of control functions and control systems that are provided to perform various control operations in the hybrid vehicle.

FIG. 1 is a view schematically showing a construction of a hybrid vehicle 10 to which the present invention is applied, for explaining major portions of control functions and control systems that are provided to perform various control operations in the hybrid vehicle 10. As shown in FIG. 1, the hybrid vehicle 10 includes an engine 12, an electric motor MG and drive wheels 14. Each of the engine 12 and the electric motor MG serves as a drive power source by which the hybrid vehicle 10 is to be driven to run. The electric motor MG is connected to a power transmission path between the engine 12 and the drive wheels 14, in a power transmittable manner. The hybrid vehicle 10 further includes a power transmission apparatus 16 disposed in the power transmission path between the engine 12 and the drive wheels 14. Hereinafter, the hybrid vehicle 10 will be simply referred to as "vehicle 10".

The engine 12 is a known internal combustion engine such as gasoline engine and diesel engine. The vehicle 10 is provided with an engine control device 50 that includes a throttle actuator, a fuel injection device and an ignition device. With the engine control device 50 being controlled by an electronic control apparatus 90 that is described below, an engine torque Te, which is an output torque of the engine 12, is controlled.

The electric motor MG is an electric rotating machine having a function as a motor for generating a mechanical power from an electric power and also a function as a generator for generating the electric power from the mechanical power. That is, the electric motor MG is a so-called motor generator. The electric motor MG is connected to a battery 54 provided in the vehicle 10, through an inverter 52 provided in the vehicle 10. The inverter 52 is controlled by the electronic control apparatus 90 whereby a MG torque Tm as an output torque of the electric motor MG is controlled. The MG torque Tm serves as a power running torque when acting as a positive torque for acceleration, with the electric motor MG being rotated in a forward direction that is the same as a direction of rotation of the engine 12 during operation of the engine 12. The MG torque Tm serves as a regenerative torque when acting as a negative torque for deceleration, with the electric motor MG being rotated in the forward direction. Specifically, the electric motor MG receives the electric power from the battery 54 through the inverter 52, and generates the power for running the vehicle 10, in place of or in addition to the engine 12. Further, the electric motor MG generates the electric power based on the power of the engine 12 or a driven power transmitted from the drive wheels 14. The electric power generated by the electric motor MG is supplied to the battery 54 though the inverter 52 so as to be stored in the battery 54. The battery 54 is an electric storage device to and from which the electric power is supplied from and to the electric motor MG.

The power transmission apparatus 16 includes a casing 18 as a non-rotary member that is attached to a body of the vehicle 10, a damper 20, a connecting/disconnecting clutch K0, a starting clutch WSC and a automatic transmission 22, such that the damper 20, connecting/disconnecting clutch K0, starting clutch WSC and automatic transmission 22 are disposed inside the casing 18. The damper 20 is disposed between the engine 12 and the connecting/disconnecting clutch K0, namely, disposed in a part of the power transmission path between the engine 12 and the drive wheels 14, wherein the part is located between the engine 12 and the connecting/disconnecting clutch K0. The connecting/disconnecting clutch K0 is disposed between the engine 12 and the electric motor MG, namely, disposed in a part of the power transmission path between the engine 12 and the drive wheels 14, wherein the part is located between the engine 12 and the electric motor MG. The starting clutch WSC is disposed between the electric motor MG and the automatic transmission 22, namely, disposed in a part of the power transmission path between the engine 12 and the drive wheels 14, wherein the part is located between the electric motor MG and the automatic transmission 22. The automatic transmission 22 constitutes a part of the power transmission path between the engine 12 and the drive wheels 14, wherein the part is located between the electric motor MG and the drive wheels 14. The automatic transmission 22 is connected to the engine 12 through the connecting/disconnecting clutch K0 and the starting clutch WSC, and is connected to the electric motor MG through the starting clutch WSC.

The power transmission apparatus 16 further includes a propeller shaft 26 connected to a transmission output shaft 24 that is an output rotary member of the automatic transmission 22, a differential gear device 28 connected to the propeller shaft 26, and a pair of drive shafts 30 connected to the differential gear device 28. The power transmission apparatus 16 still further includes an engine connection shaft 32 connecting between the engine 12 and the damper 20, a damper connection shaft 34 connecting the damper 20 and the connecting/disconnecting clutch K0, and an electric-motor connection shaft 36 connecting between the connecting/disconnecting clutch K0 and the starting clutch WSC.

The electric motor MG is connected to the electric-motor connection shaft 36 in a power transmittable manner in the casing 18. That is, the electric motor MG is connected to a part of the power transmission path in a power transmittable manner, wherein the part is located between the connecting/disconnecting clutch K0 and the starting clutch WSC. Thus, the electric motor MG is connected to the automatic transmission 22 without through the connecting/disconnecting clutch K0, in a power transmittable manner.

The damper 20 includes elastic bodies such as compression coil springs, so as to serve as a so-called torsional damper for absorbing torque fluctuation of the engine 12 and absorbing torsional vibration.

The connecting/disconnecting clutch K0 is a wet or dry frictional engagement device in the form of a multiple-disc type or a single-disc type clutch that is to be pressed by a hydraulic actuator, for example. The connecting/disconnecting clutch K0 receives a regulated engagement hydraulic pressure for the connecting/disconnecting clutch K0 in the form of a K0 hydraulic pressure PR0 supplied from a hydraulic control unit (hydraulic control circuit) 56 provided in the vehicle 10, whereby a K0 clutch torque Tk0, i.e., torque capacity of the connecting/disconnecting clutch K0 is changed and its operation state is switched among an engaged state, a released state and a slipped state.

The connecting/disconnecting clutch K0 serves as a clutch for selectively establishing and cutting off a power transmission path between the engine 12 and the electric motor MG, namely, a clutch for selectively connecting and disconnecting the engine 12 to and from the electric motor MG. When the connecting/disconnecting clutch K0 is placed in the engaged state, the engine 12 and the electric motor MG are connected to each other through the damper 20 in a power transmittable manner. On the other hand, when the connecting/disconnecting clutch K0 is placed in the released state, transmission of the power between the engine 12 and the electric motor MG is cut off. That is, the connecting/disconnecting clutch K0 is configured, when being placed in the engaged state, to connect the engine 12 and the electric motor MG, and is configured, when being placed in the released state, to cut off the connection between the engine 12 and the electric motor MG.

The starting clutch WSC is a wet frictional engagement device in the form of a multiple-disc type clutch that is to be pressed by a hydraulic actuator, for example. The starting clutch WSC receives a regulated engagement hydraulic pressure for the starting clutch WSC in the form of a WSC hydraulic pressure PRwsc supplied from the hydraulic control unit 56, whereby a WSC clutch torque Twsc, i.e., torque capacity of the starting clutch WSC is changed and its operation state is switched among an engaged state, a released state and a slipped state. When the starting clutch WSC is placed in the engaged state, a drive power from the engine 12 as the drive power source and/or from the electric motor MG as the drive power source are made transmittable to the automatic transmission 22.

The automatic transmission 22 is a known automatic transmission of a planetary gear type which includes a transmission input shaft 38 as an input rotary member, the above-described transmission output shaft 24, a plurality of planetary gear devices (not shown), and a plurality of engagement devices CB, for example. The automatic transmission 22 is configured to receive the drive power inputted to the transmission input shaft 38 from the drive force source or sources (engine 12 and/or the electric motor MG), and output from the transmission output shaft 24 to the drive wheels 14. The engagement devices CB includes an input clutch C1 connected to the transmission input shaft 38, for example. The input clutch C1 is connected to the transmission input shaft 38, for example, such that a C1 input member C1$i$ as an input-side member of the input clutch C1 is to be rotated by rotation of the transmission input shaft 38. The transmission input shaft 38 and the C1 input member C1$i$ do not necessarily have to be connected integrally to each other.

Each of the engagement devices CB is a hydraulically-operated frictional engagement device in the form of a wet multiple-disc or single-disc type clutch or brake that is to be pressed by a hydraulic actuator, or a band brake that is to be tightened by a hydraulic actuator. The input clutch C1 is a wet frictional engagement device. Each of the engagement devices CB receives a regulated engagement hydraulic pressure PRcb for the engagement device CB, which is supplied from the hydraulic control unit 56, whereby an engaging torque Tcb, i.e., torque capacity of the engagement device CB is changed and its operation state is switched among an engaged state, a released state and a slipped state.

In the automatic transmission 22, selected ones of rotary elements of the plurality of planetary gear devices are connected to each other or to the transmission input shaft 38, casing 18 or transmission output shaft 24, either directly or indirectly through the engagement devices CB.

The automatic transmission 22 is a step-variable automatic transmission configured to establish a selected one of a plurality of gear positions, with a corresponding one or ones of the engagement devices CB being engaged, wherein the gear positions are different from each other in gear ratio (speed ratios) $\gamma$ (=AT input rotational speed Ni/AT output rotational speed No). The AT input rotational speed Ni is a rotational speed of the transmission input shaft 38, and is an input rotational speed of the automatic transmission 22. The AT input rotational speed Ni is also a rotational speed of a WSC output member WSCo as an output-side member of the starting clutch WSC, since the transmission input shaft 38 and the WSC output member WSCo are connected integrally to each other. The AT output rotational speed No is a rotational speed of the transmission output shaft 24, and is an output rotational speed of the automatic transmission 22.

The automatic transmission 22 is capable of establishing a plurality of forward-driving gear positions and a reverse-driving gear position, wherein the plurality of forward-driving gear positions include at least a first-speed gear position and a second-speed gear position, for example. A gear ratio $\gamma$ of the automatic transmission 22 is maximized when the first-speed gear position is established in the automatic transmission 22, and is reduced as a higher-speed gear position is established. Further, the automatic transmission 22 is placed in its neutral state in which any one of the gear positions is not established, for example, with any one of the engagement devices CB being in the released state. When the automatic transmission 22 is placed in the neutral state, for example, the power is not transmittable through the automatic transmission 22. It is noted that the automatic transmission 22 is placed in the neutral state, also by placing the input clutch C1 in its released state, for example. The input clutch C1 is one of engagement devices that are to be placed in the engaged states, for example, when one of the gear positions is to be established in the automatic transmission 22.

The automatic transmission 22 is configured to switch from one of the gear positions to another one of the gear positions, namely, to establish one of the gear positions which is selected, by the electronic control apparatus 90, according to, for example, an accelerating operation made by a vehicle driver (operator) and the vehicle running speed V. The automatic transmission 22 is shifted up or down from one of the gear positions to another, for example, by so-called "clutch-to-clutch" shifting operation that is made by releasing and engaging actions of selected two of the engagement devices CB, namely, by a releasing action of one of the engagement devices CB and an engaging action of another one of the engagement devices CB.

The vehicle 10 further includes a mechanical pump MOP that is a mechanically-operated oil pump, an electrical pump EOP that is an electrically-operated oil pump, and a pump motor 58. The mechanical pump MOP is connected to the electric-motor connection shaft 36 through a transmission member 60 that is constituted by, for example, sprockets and chains. The mechanical pump MOP is to be rotated and driven by the drive power source or sources (i.e., engine 12 and/or electric motor MG), so as to output a working fluid OIL that is to be used in the power transmission apparatus 16. The pump motor 58 is a motor serving exclusively to rotate and drive the electrical pump EOP. The electrical pump EOP outputs the working fluid OIL, when being rotated and driven by the pump motor 58. With an operation state of the pump motor 58 being controlled by the electronic control apparatus 90, an operation state of the electric pump EOP is controlled so as to be placed in its operated state or stopped state, for example. The electrical pump EOP is placed in the operated state by the electronic control apparatus 90, for example, when the operation of the engine 12 is stopped. The working fluid OIL outputted by the mechanical pump MOP or the electrical pump EOP is supplied to the hydraulic control unit 56. The working fluid OIL is regulated, by the hydraulic control unit 56, to the engaging pressures PRcb for the respective engagement devices CB, the K0 hydraulic pressure PRk0 and the WSC hydraulic pressure PRwsc, for example, and these regulated pressures are supplied to the power transmission apparatus 16. The working fluid OIL serves also as a lubricant oil that is used for lubricating the starting clutch WSC, input clutch C1 and other elements included in the power transmission apparatus 16.

In the power transmission apparatus 16, the power outputted by the engine 12 is transmitted to the drive wheels 14 from the engine connection shaft 32, via the damper 20, damper connection shaft 34, connecting/disconnecting clutch K0, electric-motor connection shaft 36, starting clutch WSC, automatic transmission 22, propeller shaft 26, differential gear device 28 and drive shafts 30, in this order of description, when both of the connecting/disconnecting clutch K0 and the starting clutch WSC are placed in the engaged states. Further, in the power transmission apparatus 16, the power outputted by the electric motor MG is transmitted to the drive wheels 14 from the electric-motor connection shaft 36, via the starting clutch WSC, automatic transmission 22, propeller shaft 26, differential gear device 28 and drive shafts 30, in this order of description, when the starting clutch WSC is placed in the engaged state, irrespective of the operation state of the connecting/disconnecting clutch K0. It is noted that the power corresponds to a torque or a force unless they are to be distinguished from one another.

The vehicle 10 is provided with the electronic control apparatus 90 as a controller including a control apparatus configured to control start of the engine 12, for example. The electronic control apparatus 90 includes a so-called microcomputer incorporating a CPU, a RAM, a ROM and an input-output interface. The CPU performs various control operations of the vehicle 10, by processing various input signals, according to control programs stored in the ROM, while utilizing a temporary data storage function of the RAM. The electronic control apparatus 90 may be constituted by two or more control units exclusively assigned to perform respective different control operations such as an engine control operation, an electric-motor control operation and a hydraulic-pressure control operation, as needed.

The electronic control apparatus 90 receives various input signals based on values detected by respective sensors provided in the vehicle 10. Specifically, the electronic control apparatus 90 receives: an output signal of an engine speed sensor 62 indicative of an engine rotational speed Ne that is a rotational speed of the engine 12; an output signal of an MG speed sensor 64 indicative of an MG rotational speed Nm that is a rotational speed of the electric motor MG; an output signal of an input speed sensor 66 indicative of the AT input rotational speed Ni; an output signal of an output speed sensor 68 indicative of the AT output rotational speed No corresponding to the vehicle running speed V; an output signal of an accelerator-opening degree sensor 70 indicative of an accelerator opening degree (accelerator operation degree) θacc representing an amount of accelerating operation made by the vehicle driver; an output signal of a throttle-opening degree sensor 72 indicative of a throttle opening degree θth that is an opening degree of an electronic throttle valve; an output signal of a brake switch 74 indicative of a brake ON signal Bon representing a state in which a brake pedal is being operated by the vehicle driver so as to operate wheel brakes; an output signal of a shift position sensor 76 indicative of an operation position POSsh of a shift lever 84 provided in the vehicle 10; an output signal of an engine-water temperature sensor 78 indicative of an engine-coolant water temperature THeng that is a temperature of a coolant water COOL of the engine 12; an output signal of a battery sensor 80 indicative of a battery temperature THbat, a battery charging/discharging electric current Ibat and a battery voltage Vbat of the battery 54; and an output signal of a fluid temperature sensor 82 indicative of a working fluid temperature THoil that is a temperature of the working fluid OIL in the hydraulic control unit 56. The engine rotational speed Ne is also a rotational speed of the engine connection shaft 32. The MG rotational speed Nm is also a rotational speed of the electric-motor connection shaft 36, and is also a rotational speed of a WSC input member WSCi that is an input-side member of the starting clutch WSC. The WSC input member WSCi is connected integrally to the electric-motor connection shaft 36, namely, is connected integrally to the electric motor MG.

The electronic control apparatus 90 generates various command signals to the various devices provided in the vehicle 10, such as: an engine control command signal Se that is to be supplied to the engine control device 50 for controlling the engine 12; an electric-motor control command signal Sm that is to be supplied to the inverter 52 for controlling the electric motor MG; an AT hydraulic-pressure control command signal Sat that is to be supplied to the hydraulic control unit 56 for controlling the operation states of the engagement devices CB; a K0 hydraulic-pressure control command signal Sko that is to be supplied to the hydraulic control unit 56 for controlling the operation state of the connecting/disconnecting clutch K0; a WSC hydraulic-pressure control command signal Swsc that is to be supplied to the hydraulic control unit 56 for controlling the operation state of the starting clutch WSC; and an EOP control command signal Seop that is to be supplied to the pump motor 58 for controlling the operation state of the electrical pump EOP.

The shift lever 84 is a shift operation member for permitting the vehicle driver to manually select one of a plurality of shift positions in the automatic transmission 22, i.e., a shift operation device that is to be manually operated by the vehicle driver to accept a request for switching the shift position of the automatic transmission 22. The shift lever 84 is to be operated, by the vehicle driver, to be placed in the operation position POSsh corresponding to the selected one of the shift positions in the automatic transmission 22.

The shift lever 84 is to be placed in one of a plurality of operation positions as the operation position POSsh, wherein the plurality of operation positions include P, R, N and D operation positions, for example. The P operation position is for selecting a parking position (=P position) as one of the shift positions in the automatic transmission 22. When the P position is selected in the automatic transmission 22, the automatic transmission 22 is placed in the neutral state and rotation of the transmission output shaft 24 is mechanically inhibited. The mechanical inhibition of rotation of the transmission output shaft 24 is made by a known parking lock mechanism. That is, the automatic transmission 22 is placed in its parking lock state, when the P position is selected in the automatic transmission 22. The R operation position is a reverse-driving operation position for selecting a reverse driving position (=R position) as one of the shift positions in the automatic transmission 22. When the R position is selected in the automatic transmission 22, the vehicle 10 is enabled to run in reverse direction. The N operation position is a neutral operation position for selecting a neutral position (=N position) as one of the shift positions in the automatic transmission 22. When the N position is selected in the automatic transmission 22, the automatic transmission 22 is placed in the neutral state. The D operation position is a forward-driving operation position for selecting a forward driving position (=D position) as one of the shift positions in the automatic transmission 22. When the D position is selected in the automatic transmission 22, the vehicle 10 is enabled to run in forward direction. Each of the P position and the N position as ones of the shift positions in the automatic transmission 22 corresponds to a non-driving position. Each of the D position and the R position as ones of the shift positions in the automatic transmission 22 corresponds to a driving position. When the automatic transmission 22 is placed in the non-driving position, the power is not transmittable through the automatic transmission 22. When the automatic transmission 22 is placed in the driving position, the power is transmittable through the automatic transmission 22.

For performing various control operations in the vehicle 10, the electronic control apparatus 90 includes a hybrid control means in the form of a hybrid control portion 92, a shift control means in the form of a transmission control portion 94, and a starting-clutch control means in the form of a starting-clutch control portion 96.

The hybrid control portion 92 has a function serving as an engine control means in the form of an engine control portion 92a for controlling operation of the engine 12 and a function serving as an electric-motor control means in the form of an electric-motor control portion 92b for controlling operation of the electric motor MG through the inverter 52, and executes a hybrid-drive control operation, for example, using the engine 12 and the electric motor MG through these control functions.

The hybrid control portion 92 calculates a requested drive amount of the vehicle 10 requested by the vehicle driver, by applying the accelerator opening degree θacc and the vehicle running speed V, for examples, to a requested drive amount map that represents a pre-stored relationship obtained by experimentation or determined by an appropriate design theory. The requested drive amount is, for example, a requested drive torque Trdem [Nm] of the drive wheels 14. From another point of view, the requested drive torque Trdem is a requested drive power Prdem [W] at the current vehicle running speed V. As the requested drive amount, another value such as a requested drive power Frdem [N] of the drive wheels 14 and a requested AT output torque of the transmission output shaft 24 may be used, too. In the calculation of the requested drive amount, it is also possible to use, for example, the AT output rotational speed No in place of the vehicle running speed V.

The hybrid control portion 92 outputs the engine control command signal Se and the electric-motor control command signal Sm for controlling the engine 12 and the electric motor MG, respectively, such that the requested drive power Prdem is realized, by taking account of various factors such as a transmission loss, an auxiliary load, the gear ratio γ of the automatic transmission 22 and the maximum chargeable amount Win and maximum dischargeable amount Wout of the battery 54. The engine control command signal Se is, for example, a command value of an engine power Pe that is the power of the engine 12 outputting the engine torque Te at the current engine rotational speed Ne. The electric-motor control command signal Sm is, for example, a command value of a consumed electric power Wm of the electric motor MG outputting the motor torque Tm at the current motor rotational speed Nm.

The maximum chargeable amount Win of the battery 54 is a maximum amount of the electric power that can be inputted to the battery 54, and represents a limitation of the electric power inputted to the battery 54, namely, a limitation of input to the battery 54. The maximum dischargeable amount Wout of the battery 54 is a maximum amount of the electric power that can be outputted from the battery 54, and represents a limitation of the electric power outputted from the battery 54, namely, a limitation of output of the battery 54. The maximum chargeable and dischargeable amounts Win, Wout are calculated by the electronic control apparatus 90, for example, based on the battery temperature THbat and a state-of-charge value SOC [%] of the battery 54. The state-of-charge value SOC of the battery 54 is a value indicative of a charged state of the battery 54, i.e., an amount of the electric power stored in the battery 54, and is calculated by the electronic control apparatus 90, for example, based on the charging/discharging electric current Ibat and the voltage Vbat of the battery 54.

When the requested drive torque Trdem is in a range that can be covered by only the output of the electric motor MG, the hybrid control portion 92 establishes a motor running (=EV running) mode as a running mode. When the EV running mode is established, the hybrid control portion 92 causes the vehicle 10 to perform an EV running with the connecting/disconnecting clutch K0 being released and with only the electric motor MG serving as the drive power source. On the other hand, when the requested drive torque Trdem is in a range that cannot be covered without at least the output of the engine 12, the hybrid control portion 92 establishes another running mode that is an engine running mode, i.e., a hybrid running (=HV running) mode. When the HV running mode is established, the hybrid control portion 92 causes the vehicle 10 to perform an engine running, i.e., an HV running (hybrid running) with the connecting/disconnecting clutch K0 being engaged and with at least the engine 12 serving as the drive power source. Thus, the hybrid control portion 92 switches between the EV running mode and the HV running mode, based on, for example, the requested drive torque Trdem, by automatically stopping the engine 12 during the HV running, restarting the engine 12 after the stop of the engine 12, and starting the engine 12 during the EV running mode. Further, even when the requested drive torque Trdem is in the range that can be covered by only the output of the electric motor MG, the hybrid control portion 92 establishes the HV running mode, for example, in a case in which the state-of-charge value SOC of the battery 54 becomes less than a predetermined engine-start threshold value or in a case in which the engine 12 or other component needs to be warmed up. The engine-start threshold value is a predetermined threshold value for determining that the state-of-charge value SOC reaches a level at which the engine 12 must forcibly be started for charging the battery 54.

The hybrid control portion 92 determines whether the the start of the engine 12 is requested or not, for example, depending on (i) whether the requested drive torque Trdem has become larger than the range that can be covered by only the output of the electric motor MG during the EV running mode, (ii) whether the the engine 12 or other component needs to be warmed up and (iii) whether the battery 54 needs to be charged.

The hybrid control portion 92 has a function serving as an engine-start control means in the form of an engine-start control portion 92c configured, when determining that the start of the engine 12 is requested, to execute an engine-start control operation for starting the engine 12. In execution of the engine-start control operation, the engine-start control portion 92c outputs the K0 hydraulic control command signal Sko for causing the connecting/disconnecting clutch K0 to be switched from its released state to its engaged state, and outputs also the electric-motor control command signal Sm for causing the electric motor MG to output a torque required to start the engine 12, such that the outputted K0 hydraulic control command signal Sko and the outputted electric-motor control command signal Sm are supplied to the hydraulic control unit 56 and the inverter 52, respectively, for thereby increasing the engine rotational speed Ne. Then, after having increased the engine rotational speed Ne to a predetermined starting speed value Nest by the electric motor MG, the engine-start control portion 92c outputs the engine control command signal Se for injecting a fuel to the engine 12 and igniting the engine 12, such that the outputted engine control command signal Se is supplied to the engine control device 50 for thereby starting the engine 12 and causing the engine 12 to be self-rotated. The predetermined starting speed value Nest is, for example, a predetermined speed value of the engine rotational speed Ne at which a complete explosion can be made in the engine 12 that is being self-rotated after an initial combustion of the engine 12.

The torque required to start the engine 12 is a cranking torque Tcr for cranking the engine 12, and a magnitude of the cranking torque Tcr is predetermined based on, for example, specifications of the engine 12. The cranking torque Tcr is the MG torque Tm that is supplied from the electric motor MG to the engine 12 though the connecting/disconnecting clutch K0. From another point of view, the torque required to start the engine 12 is the K0 clutch torque Tk0 required for cranking the engine 12, and corresponds to the K0 clutch torque Tk0 for transmitting the torque from the electric motor MG toward the engine 12.

When the vehicle 10 is in the stopped state, the engine-start control portion 92c executes the engine-start control operation, with the starting clutch WSC being placed in the released state. When the vehicle 10 is performing the EV running, the engine-start control portion 92c executes the engine-start control operation, with the starting clutch WSC being placed in the engaged state. In execution of the engine-start control operation during the EV running, the MG torque Tm serving as the cranking torque Tcr, in addition to the MG torque Tm serving as the drive torque Tr for the EV running, is to be outputted from the electric motor MG, so that the MG torque Tm serving as the cranking torque Tcr needs to be assured so as to avoid reduction of the drive torque Tr. To this end, during the EV running, the cranking torque Tcr needs to be available or assured in preparation for the engine-start control operation. Therefore, when the engine-start control operation is to be executed, the determination as to whether the requested drive torque Trdem can be covered by only the output of the electric motor MG or not, is made by comparing the requested drive torque Trdem with a torque value obtained by subtracting the cranking torque Tcr from an outputtable maximum torque of the electric motor MG. The outputtable maximum torque of the electric motor MG is an outputtable maximum value of the motor torque Tm which is dependent on the maximum dischargeable amount Wout of the battery 54.

After the combustion of the engine 12 has been stabilized as a result of the complete explosion, the hybrid control portion 92 controls an output of the engine 12, by supplying, to the engine control device 50, the engine control command signal Se for increasing the engine rotational speed Ne to a target engine rotational speed Netgt as a target speed value of the engine rotational speed Ne. The target engine rotational speed Netgt is an idling rotational speed Neidl, for example, when the vehicle 10 is in the stopped state with acceleration off.

The transmission control portion 94 determines whether a shifting action is to be executed in the automatic transmission 22, by using, for example, a shifting map that represents a predetermined relationship, and outputs the AT hydraulic control command signal Sat, as needed, which is supplied to the hydraulic control unit 56, for executing the shifting action in the automatic transmission 22 by switching the operation states of corresponding ones of the engagement devices CB. In the shifting map, the predetermined relationship is represented by shifting lines in two-dimensional coordinates in which the vehicle running speed V and the requested drive torque Trdem as two variables are taken along respective two axes, wherein the shifting lines are used for the determination as to whether the shifting action is to be executed in the automatic transmission 22. In the shifting map, one of the two variables may be the AT output rotational speed No in place of the vehicle running speed V, and the other of the two variables may be any one of the requested drive power Frdem, accelerator opening degree θacc and throttle opening degree θth in place of the requested drive torque Trdem.

When the operation position POSsh of the shift lever 84 is the P operation position or the N operation position, the transmission control portion 94 outputs the AT hydraulic control command signal Sat that is supplied to the hydraulic control unit 56, for placing the input clutch C1 into the released state, whereby the automatic transmission 22 is placed into the non-driving position. When the operation position POSsh of the shift lever 84 is the R operation position or the D operation position, the transmission control portion 94 outputs the AT hydraulic control command signal Sat that is supplied to the hydraulic control unit 56, for establishing a gear position dependent on the current state of the vehicle 10, in the automatic transmission 22, whereby the automatic transmission 22 is placed into the driving position. When the vehicle 10 is in the stopped state with the operation position POSsh being the D operation position, the first-speed gear position is established in the automatic transmission 22.

When the vehicle 10 is in the stopped state, the starting-clutch control portion 96 keeps the starting clutch WSC in the released state. When the vehicle 10 is to be started to run, the starting-clutch control portion 96 switches the starting clutch WSC from the released state to the engaged state via the slipped state. When the vehicle 10 is running, the starting-clutch control portion 96 keeps the starting clutch WSC in the engaged state. When the vehicle 10 is to be switched from the running state to the stopped state, the starting-clutch control portion 96 switches the starting clutch WSC from the engaged state to the released state. It is noted that, where the engine-start control operation is not executed during the EV running mode with the vehicle 10 being in the stopped state, the starting clutch WSC does not necessarily have to be placed in the released state.

As described above, the starting clutch WSC is switched from the released state to the engaged state via the slipped state, at least when the vehicle 10 is started to run during operation of the engine 12. In the vehicle 10, for performing the slipping start using the starting clutch WSC, the starting clutch WSC has a larger number of friction plates with a contact surface of each friction member being larger, as compared with other wet frictional engagement devices such as the input clutch C1. In a wet frictional engagement device, a drag torque is generated when the engagement device is in the released state. In general, such a drag torque is increased with increase of the contact surface of the friction member, and is increased with increase of the number of the friction plates. In the vehicle 10, the starting clutch WSC and the input clutch C1 are constructed such that the drag torque of the starting clutch WSC in the released state of the starting clutch WSC is larger than the drag torque of the input clutch C1 in the released state of the input clutch C1.

In process of increase of the engine rotational speed Ne in the vehicle 10, a resonance is generated when the engine rotational speed Ne passes through a resonance rotational speed of a drive system that includes the damper 20. That is, in the vehicle 10, the resonance of the drive system including the damper 20 is generated, due to the damper 20. The drive system is constituted by the engine 12 and members that are rotated by rotation of the engine 12. The members rotated by rotation of the engine 12 are a part of rotary members of the power transmission apparatus 16, the electric motor MG and the mechanical pump MOP, for example. The resonance rotational speed of the drive system is changed depending on the members rotated by rotation of the engine 12.

Figure 2:
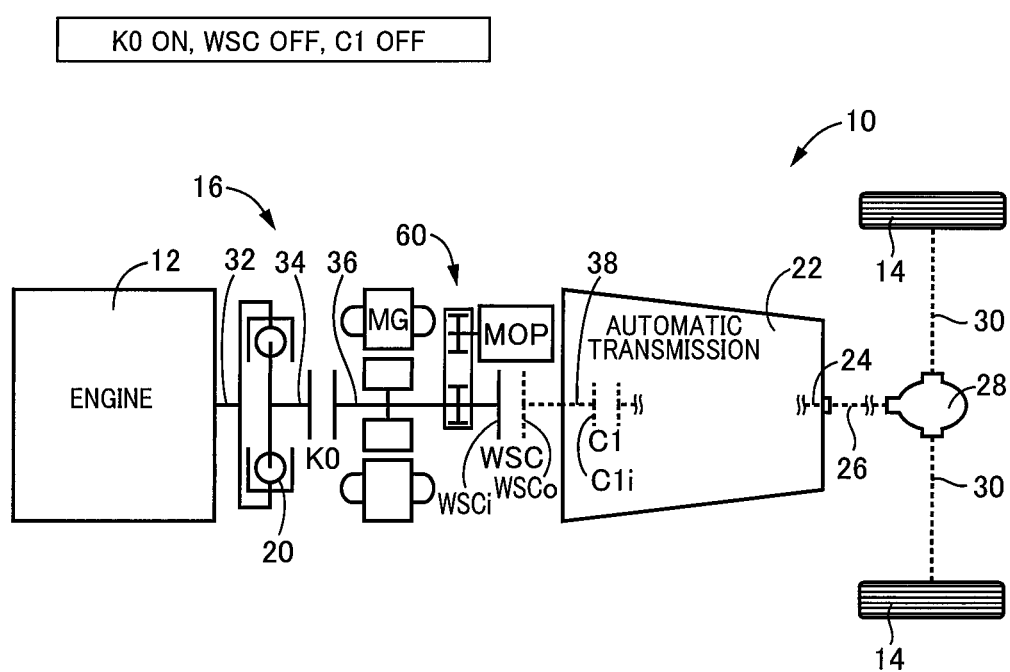
FIG. 2 is a view for explaining a first resonance rotational speed.

FIG. 2 is a view for explaining a first resonance rotational speed N1. In FIG. 2, solid lines represent the members that are rotated by rotation of the engine 12, while broken lines represent members that are not rotated by rotation of the engine 12. When the connecting/disconnecting clutch K0 is in the engaged state and the starting clutch WSC and the input clutch C1 are in the released states, members from the engine connection shaft 32 to the WSC input member WSCi are to be rotated together with the electric motor MG by rotation of the engine 12. The first resonance rotational speed N1 is a resonance rotational speed of the drive system including the damper 20 in a state in which the members from the engine connection shaft 32 to the WSC input member WSCi are rotated integrally with the electric motor MG. The first resonance rotational speed N1 is a predetermined first resonance rotational speed.

Figure 3:
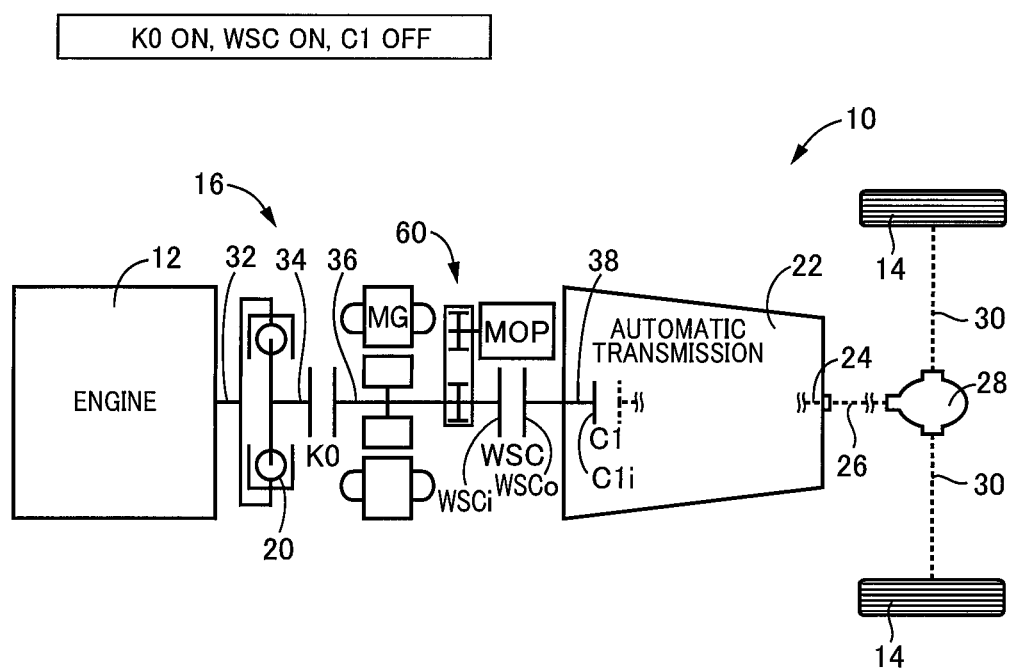
FIG. 3 is a view for explaining a second resonance rotational speed.

FIG. 3 is a view for explaining a second resonance rotational speed N2. In FIG. 3, solid lines represent the members that are rotated by rotation of the engine 12, while broken lines represent members that are not rotated by rotation of the engine 12. When the connecting/disconnecting clutch K0 and the starting clutch WSC are in the engaged states and the input clutch C1 is in the released state, members from the engine connection shaft 32 to the C1 input member C1i are to be rotated together with the electric motor MG by rotation of the engine 12. The second resonance rotational speed N2 is a resonance rotational speed of the drive system including the damper 20 in a state in which the members from the engine connection shaft 32 to the C1 input member C1i are rotated integrally with the electric motor MG, namely, in which the C1 input member C1i as well as the starting clutch WSC is rotated integrally with the electric motor MG. The second resonance rotational speed N2 is a predetermined second resonance rotational speed that is lower than the first resonance rotational speed N1.

As described above, when the vehicle 10 is in the stopped state, the engine-start control operation is executed with the starting clutch WSC being placed in the released state. When the operation position POSsh is the P operation position or N operation position, the input clutch C1 is placed in the released state. During execution of the engine-start control operation when the vehicle 10 is in the stopped state with the operation position POSsh being the P operation position or N operation position, the resonance rotational speed of the drive system is the first resonance rotational speed N1. The predetermined starting speed value Nest in the execution of the engine-start control operation is a value lower than the first resonance rotational speed N1, for example, such that the engine rotational speed Ne does not pass through the first resonance rotational speed N1 during cranking of the engine 12 by the electric motor MG and such that, after the initial explosion, the engine torque Te becomes a torque value that enables the engine rotational speed Ne to quickly pass through the first resonance rotational speed N1 after the initial explosion.

By the way, since the drag torque of the starting clutch WSC is larger than the drag torque of the input clutch C1, the WSC output member WSCo is likely to be dragged and rotated by the WSC input member WSCi when the engine-start control operation is executed with the starting clutch WSC being in the released state and with the input clutch C1 being in the released state. Therefore, upon execution of the engine-start control operation with the starting clutch WSC being in the released state and with the input clutch C1 being in the released state, there is a case in which even the C1 input member C1$i$ as well as the starting clutch WSC is rotated integrally with the electric motor MG, as in the state shown in FIG. 3, in spite of the released state of the starting clutch WSC. In this case, the resonance rotational speed of the drive system is changed from the first resonance rotational speed N1 to the second resonance rotational speed N2 or a speed value close to the second resonance rotational speed N2, so that there is a risk that start of the engine 12 could be made difficult due to generation of resonance of the drive system when the engine rotational speed Ne is being increased by the electric motor MG in process of the engine-start control operation, or there is a risk that start of the engine 12 could be made difficult because the engine rotational speed Ne is not smoothly increased after the initial explosion of the engine 12 due to generation of resonance of the drive system in process of the engine-start control operation. Since a viscosity of the working fluid OIL is increased with reduction of the working fluid temperature THoil, the drag torque of the starting clutch WSC is likely to be increased with the reduction of the working fluid temperature THoil. Therefore, the phenomenon of difficulty of start of the engine 12 as described above is made remarkable, particularly, when the working fluid temperature THoil is extremely low.

When the connecting/disconnecting clutch K0 is in the engaged state and the starting clutch WSC is in the released state, if the input clutch C1 is placed in the engaged state, an inertial connected to the WSC output member WSCo is made larger as compared with in the released state of the input clutch C1. Therefore, in the execution of the engine-start control operation with the starting clutch WSC being in the released state, the WSC output member WSCo is made difficult to be dragged and rotated by the WSC input member WSCi, by placing the input clutch C1 in the engaged state.

Thus, by placing the input clutch C1 in the engaged state, it is possible to avoid the situation in which even the C1 input member C1$i$ as well as the starting clutch WSC is rotated integrally with the electric motor MG, and to maintain the state in which the members from the engine connection shaft 32 to the WSC input member WSCi of the starting clutch WSC are rotated together with the electric motor MG. Therefore, in the execution of the engine-start control operation with the starting clutch WSC being in the released state, the resonance rotational speed of the drive system is kept to be the first resonance rotational speed N1, by placing the input clutch C1 into the engaged state. Further, in process of the engine-start control operation with the starting clutch WSC being in the released state, the resonance rotational speed of the drive system is changed from the first resonance rotational speed N1 to the second resonance rotational speed N2 or a speed value in vicinity of the second resonance rotational speed N2, so that it is possible to increase the engine rotational speed Ne without the engine rotational speed Ne passing through the first resonance rotational speed N1 in process of the engine-start control operation.

In process of the engine-start control operation executed with the vehicle 10 being in the stopped state and with the starting clutch WSC being in the released state, the electronic control apparatus 90 places the input clutch C1 in the engaged state in a stage until the engine rotational speed Ne exceeds the predetermined speed value Nx, and switches the input clutch C1 to the released state in a stage after the engine rotational speed Ne has exceeded the predetermined speed value Nx.

The predetermined speed value Nx is a speed value between the first resonance rotational speed N1 and the second resonance rotational speed N2, and is, preferably, distant from each of the first and second resonance rotational speeds N1, N2 by a certain degree. For example, the predetermined speed value Nx is an average speed value Nave ($=(N1+N2)/2$) between the first and second resonance rotational speeds N1, N2, or a speed value in vicinity of the average speed value Nave.

The predetermined starting speed value Nest in the execution of the engine-start control operation is a value lower than the predetermined speed value Nx, for example, such that the resonance rotational speed of the drive system has been reliably changed from the first resonance rotational speed N1 to the second resonance rotational speed N2 or a speed value close to the second resonance rotational speed N2, before the engine rotational speed Ne passes through the first resonance rotational speed N1 after the initial explosion.

Specifically, when the engine-start control operation is to be executed when the vehicle 10 is in the stopped state with the starting clutch WSC being in the released state, in a case in which the input clutch C1 is in the released state, the electronic control apparatus 90 starts the execution of the engine-start control operation after switching the input clutch C1 to the engaged state. In the execution of the engine-start control operation, the electronic control apparatus 90 causes the engine rotational speed Ne to be increased to the predetermined starting speed value Nest by the electric motor MG, and then ignites the engine 12 so as to cause the engine 12 to be self-rotated. Then, when the engine rotational speed Ne has exceeded the predetermined speed value Nx, the electronic control apparatus 90 switches the input clutch C1 back to the released state. The above-described case in which the input clutch C1 is in the released state is, for example, a case in which the automatic transmission 22 is placed in the non-driving position such as the P position and the N position.

In the following desecration as to the present embodiment, the engine-start control operation in which the input clutch C1 is placed in the engaged state in the stage until the engine rotational speed Ne has exceeded the predetermined speed value Nx, will be referred to as "resonance-avoiding engine-start control operation". Meanwhile, the engine-start control operation which is executed without switching the operation state of the input clutch C1, will be referred to as "normal engine-start control operation". For example, in process of the normal engine-start control operation with the automatic transmission 22 being in the non-driving position, the input clutch C1 is kept in the released state. Further, in process of the normal engine-start control operation with the automatic transmission 22 being in the driving position, the input clutch C1 is kept in the engaged state.

The electronic control apparatus 90 further includes a state determination means in the form of a state determination portion 98, for executing the resonance-avoiding engine-start control operation.

When it is determined by the engine-start control portion 92c that the start of the engine 12 is requested, the state determination portion 98 determines whether the vehicle 10 is in the stopped state with the input clutch C1 being in the released state. Further, when it is determined by the engine-start control portion 92c that the start of the engine 12 is requested, the state determination portion 98 determines whether the working fluid temperature THoil is the predetermined temperature value THoilf or less. The predetermined temperature value THoilf is a predetermined threshold value for determining that, when the working fluid temperature THoil is not higher than the predetermined temperature value THoilf, the working fluid temperature Thoil is so low that a viscosity of the working fluid OIL is increased to such a degree that the WSC output member WSCo is to be rotated together with the WSC input member WSCi, with the starting clutch WSC being in the released state and with the input clutch C1 being in the released state.

When determining that the start of the engine 12 is requested, the engine-start control portion 92c executes the normal engine-start control operation, in a case in which it is determined by the state determination portion 98 that (i) the vehicle 10 is running, (ii) the input clutch C1 is in the engaged state, or (iii) the working fluid temperature THoil is higher than the predetermined temperature value THoilf. In the execution of the normal engine-start control operation, the engine-start control portion 92c starts the engine 12 so as to cause the engine 12 to be self-rotated, by igniting the engine 12 after increasing the engine rotational speed Ne by causing the electric motor MG to output the cranking torque Tcr while controlling the connecting/disconnecting clutch K0 to place the connecting/disconnecting clutch K0 into the engaged state.

When it is determined by the engine-start control portion 92c that the start of the engine 12 is requested, the electronic control apparatus 90 executes the resonance-avoiding engine-start control operation, in a case in which it is determined by the state determination portion 98 that the vehicle 10 is in the stopped state with the input clutch C1 being in the released state and with the working fluid temperature THoil being not higher than the predetermined temperature value THoilf. Thus, the electronic control apparatus 90 executes the resonance-avoiding engine-start control operation, when the working fluid temperature THoil is not higher than the predetermined temperature value THoilf.

In the execution of the resonance-avoiding engine-start control operation, the transmission control portion 94 outputs the AT hydraulic control command signal Sat supplied to the hydraulic control unit 56, for switching the input clutch C1 from the released state to the engaged state. After the input clutch C1 has been switched to the engaged state by the transmission control portion 94, the engine-start control portion 92c outputs the electric-motor control command signal Sm supplied to the inverter 52, for causing the electric motor MG to output the cranking torque Tcr, while outputting the K0 hydraulic control command signal Sko supplied to the hydraulic control unit 56, for controlling the connecting/disconnecting clutch K0 so as to place the connecting/disconnecting clutch K0 into the engaged state. After increasing the rotational speed Ne to the predetermined starting speed value Nest by cranking made by the electric motor MG, the engine-start control portion 92c outputs the engine control command signal Se supplied to the engine control device 50, for injecting the fuel to the engine 12 and igniting the engine 12, so as to cause the engine 12 to be self-rotated.

In the execution of the resonance-avoiding engine-start control operation, the state determination portion 98 determines whether the engine rotational speed Ne has exceeded the predetermined speed value Nx. After the engine 12 has become self-rotated, when it is determined by the state determination portion 98 that the engine rotational speed Ne has exceeded the predetermined speed value Nx, the transmission control portion 94 outputs the AT hydraulic control command signal Sat supplied to the hydraulic control unit 56, for switching the input clutch C1 from the engaged state to the released state.

Figure 4:
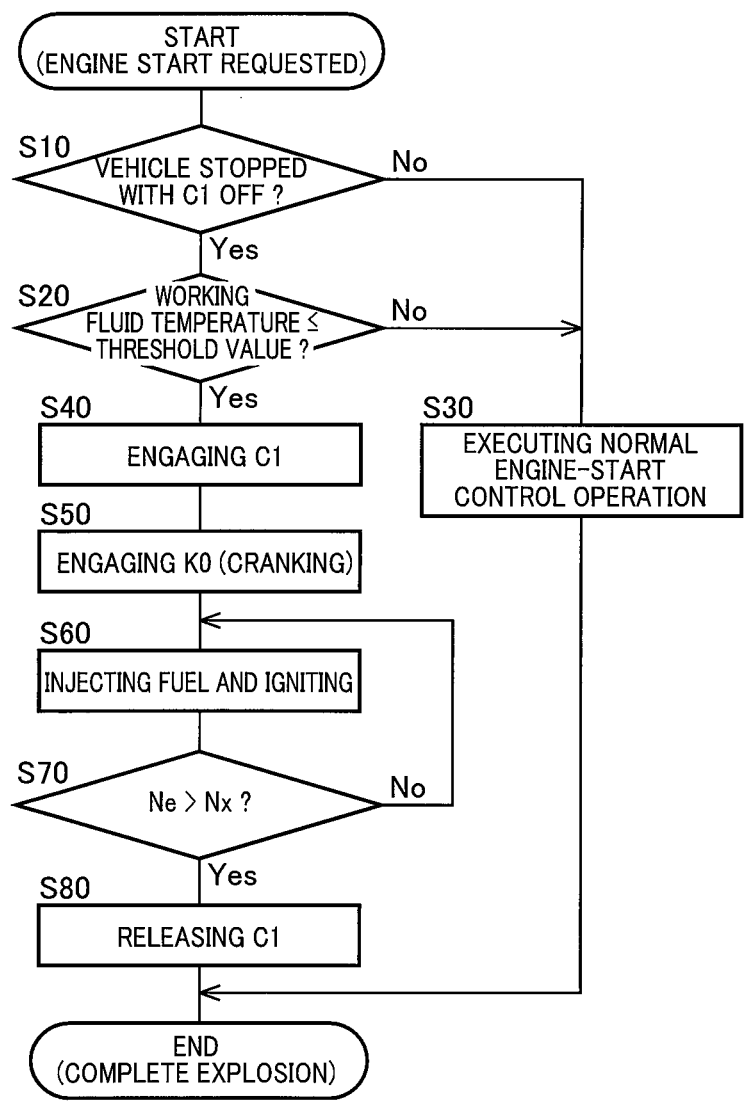
FIG. 4 is a flow chart showing a main part of a control routine executed by an electronic control apparatus, namely, a control routine that is executed for improving a startability of an engine in an engine-start control operation that is executed when the hybrid vehicle is in a stopped state with a starting clutch being in a released state.
Figure 5:
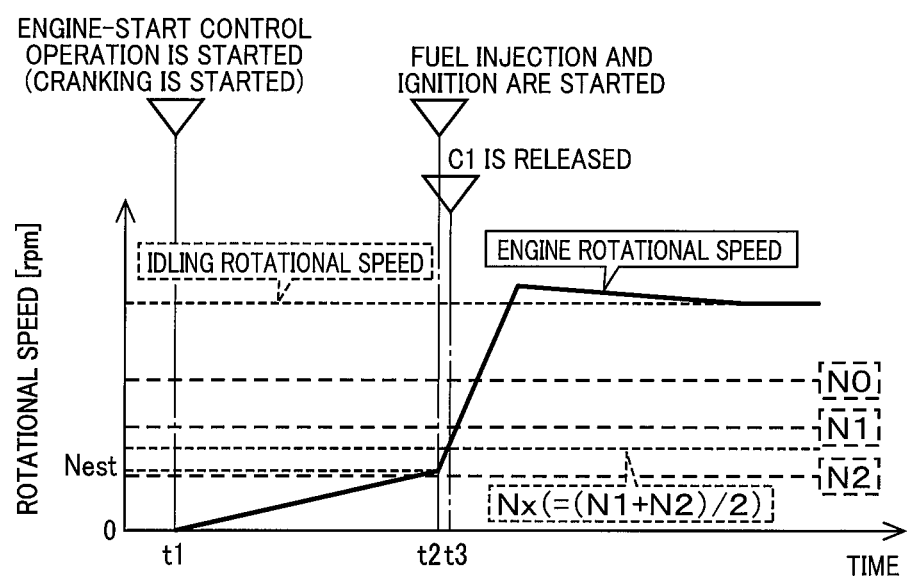
FIG. 5 is a time chart showing, by way of example, a case in which the control routine shown in the flow chart of FIG. 4 is executed.

FIG. 4 is a flow chart showing a main part of a control routine executed by the electronic control apparatus 90, namely, a control routine that is executed for improving a startability of the engine 12 in the engine-start control operation that is executed when the vehicle 10 is in the stopped state with the starting clutch WSC being in the released state. This control routine is executed, for example, when the start of the engine 12 is requested. FIG. 5 is a time chart showing, by way of example, a case in which the control routine shown in the flow chart of FIG. 4 is executed.

As shown in FIG. 4, the control routine is initiated with step S10 corresponding to function of the state determination portion 98, which is implemented to determine whether the vehicle 10 is in the stopped state with the input clutch C1 being in the released state. When an affirmative determination is made at step S10, step S20 corresponding to function of the state determination portion 98 is implemented to determine whether the working fluid temperature THoi is the predetermined temperature value THoilf or less. When a negative determination is made at step S10 or at step S20, the control flow goes to step S30 corresponding to function of the engine-start control portion 92c, which is implemented to execute the normal engine-start control operation. On the other hand, when an affirmative determination is made at step S20, steps S40-S80 are implemented to execute the resonance-avoiding engine-start control operation. Specifically, step S40 corresponding to function of the transmission control portion 94 is implemented to switch the input clutch C1 to the engaged state. Step S40 is followed by step S50 corresponding to function of the engine-start control portion 92c, which is implemented to cause the electric motor MG to output the cranking torque Tcr while causing the connecting/disconnecting clutch K0 to be placed into the engaged state. Then, step S60 corresponding to function of the engine-start control portion 92c is implemented to cause the engine 12 to be self-rotated by injecting the fuel to the engine 12 and igniting the engine 12 after the engine rotational speed Ne has been increased to the predetermined starting speed value Nest by cranking made by the electric motor MG. Step S60 is followed by step S70 corresponding to function of the state determination portion 98, which is implemented to determine whether the engine rotational speed Ne has exceeded the predetermined speed value Nx. When a negative determination is made at step S70, the control flow goes back to step S60. When an affirmative determination is made at step S70, step S80 corresponding to function of the transmission control portion 94 is implemented to switch the input clutch C1 back to the released state. In process of the normal engine-start control operation or the resonance-avoiding engine-start control operation, after the engine 12 has become self-rotated and completely exploded, the engine 12 is controlled such that the engine rotational speed Ne becomes the target engine rotational speed Netgt.

FIG. 5 shows, by way of example, a case in which the resonance-avoiding engine-start control operation is executed as the engine-start control operation. In FIG. 5, a time point t1 represents a point of time at which the resonance-avoiding engine-start control operation starts to be executed with the input clutch C1 being in the engaged state. After the resonance-avoiding engine-start control operation has started to be executed, when the engine rotational speed Ne has been increased to the predetermined starting speed value Nest by cranking made by the electric motor MG, the fuel injection to the engine 12 and the ignition of the engine 12 are started (see a time point t2) whereby the engine 12 becomes self-rotated. Then, when the engine rotational speed Ne has exceeded the predetermined speed value Nx, the input clutch C1 is switched to the released state (see a time point t3). Then, the engine 12 is completely exploded, and is controlled such that the engine rotational speed Ne becomes the target engine rotational speed Netgt such as the idling rotational speed Neidl (see after the time point t3). Thus, in process of the resonance-avoiding engine-start control operation, in the stage until the engine rotational speed Ne exceeds the predetermined speed value Nx, the resonance rotational speed of the drive system is kept to be the first resonance rotational speed N1 so that the resonance of the drive system is suppressed or avoided. Further, in process of the resonance-avoiding engine-start control operation, in the stage after the engine rotational speed Ne has exceeded the predetermined speed value Nx, the resonance rotational speed of the drive system is changed to the second resonance rotational speed N2 or a speed value in vicinity of the second resonance rotational speed N2, whereby the resonance of the drive system is suppressed or avoided. It is noted that, in FIG. 5, "NO" represents the resonance rotational speed of the drive system including the damper 20 in a state in which the members from the engine connection shaft 32 to an input-side member of the connecting/disconnecting clutch K0 are dragged and rotated by rotation of the engine 12, with the connecting/disconnecting clutch K0 being in the released state. This resonance rotational speed NO is a predetermined resonance rotational speed that is higher than the first resonance rotational speed N1.

As described above, in the present embodiment, in process of the engine-start control operation, the input clutch C1 is placed in the engaged state until the engine rotational speed Ne exceeds the predetermined speed value Nx, whereby the WSC output member WSCo is made difficult to be dragged and rotated by the WSC input member WSCi that is rotated integrally with the electric motor MG, so that the WSC input member WSCi is rotated together with the electric motor MG, without the WSC output member WSCo being rotated together with the electric motor MG. Further, the input clutch C1 is switched to the released state after the engine rotational speed Ne has exceeded the predetermined speed value Nx, whereby the WSC output member WSCo is made easy to be dragged and rotated by the WSC input member WSCi, so that the C1 input member C1i as well as the starting clutch WSC is likely to be rotated integrally with the electric motor MG. Therefore, the resonance rotational speed of the drive system is made relatively high in a stage after start of the execution of the engine-start control operation until the engine rotational speed Ne exceeds the predetermined speed value Nx, and is made relatively low in a stage after the engine rotational speed Ne has exceeded the predetermined speed value Nx. That is, by switching the input clutch C1 from the engaged state to the released state, depending on change of the engine rotational speed Ne in process of the engine-start control operation, a high state in which the resonance rotational speed of the drive system is relatively high, is switched to a low state in which the resonance rotational speed of the drive system is relatively low. Owing to the arrangement, in process of the engine-start control operation, the engine rotational speed Ne is made difficult to pass through the resonance rotational speed of the drive system or a rotational speed region that is in vicinity of the resonance rotational speed, whereby generation of resonance of the drive system can be suppressed. Therefore, it is possible to improve the startability of the engine 12 in the engine-start control operation that is executed when the vehicle 10 is in the stopped state with the starting clutch WSC being in the released state.

In the present embodiment, in the engine-start control operation that is executed when the hybrid vehicle 10 is in the stopped state with the starting clutch WSC being in the released state, the occurrence of the resonance of the drive system can be suppressed, so that it is possible to obtain also a sub-effect that is to suppress the increase of the NV such as reduction of quietness, for example.

In the present embodiment, it is possible to obtain also a sub-effect that is to improve the startability of the engine 12, even without providing the vehicle 10 with, for example, a starter that is a motor exclusively for cranking the engine 12.

In the present embodiment, the predetermined speed value Nx is the average speed value Nave between the first resonance rotational speed N1 and the second resonance rotational speed N2, or the speed value in vicinity of the average speed value Nave, wherein the first resonance rotational speed N1 is a resonance rotational speed of the drive system in the state in which the WSC input member WSCi connected to the electric motor MG is rotated integrally with the electric motor MG, and wherein the second resonance rotational speed N2 is lower than the first resonance rotational speed N1, and is the resonance rotational speed of the drive system in the state in which the C1 input member C1i as well as the starting clutch WSC is rotated integrally with the electric motor MG. Thus, in the stage after start of the execution of the engine-start control operation until the engine rotational speed Ne exceeds the predetermined speed value Nx, the resonance rotational speed of the drive system is the first resonance rotational speed N1 that is higher than the predetermined speed value Nx. In the stage after the engine rotational speed Ne has exceeded the predetermined speed value Nx, the resonance rotational speed of the drive system is the second resonance rotational speed N2 that is lower than the predetermined speed value Nx. Owing to the arrangement, in process of the engine-start control operation, the engine rotational speed Ne is made difficult to pass through the resonance rotational speed of the drive system or the rotational speed region that is in vicinity of the resonance rotational speed, whereby generation of resonance of the drive system can be appropriately suppressed.

In the present embodiment, the starting clutch WSC and the input clutch C1 are constructed such that the drag torque of the starting clutch WSC in the released state of the starting clutch WSC is larger than the drag torque of the input clutch C1 in the released state of the input clutch C1. Thus, the execution of the resonance-avoiding engine-start control operation in which in which the input clutch C1 is placed in the engaged state until the engine rotational speed Ne exceeds the predetermined speed value Nx, is useful.

In the present embodiment, in the case in which the input clutch C1 is placed in the released state when the engine-start control operation is executed with the hybrid vehicle 10 being in the stopped state and with the starting clutch WSC being in the released state, the electronic control apparatus 90 is configured to start execution of the engine-start control operation after switching the input clutch C1 to the engaged state, and to cause the engine 12 to be self-rotated, by igniting the engine 12 after increasing the engine rotational speed Ne, by the electric motor MG, to the predetermined starting speed value that is lower than the predetermined speed value Nx, and then switch the input clutch C1 to the released state when the engine rotational speed Ne has exceeded the predetermined speed value Nx. Thus, the resonance rotational speed of the drive system is made relatively high in the stage after start of the execution of the engine-start control operation until the engine rotational speed Ne is caused to exceed the predetermined speed value Nx by self-rotation of the engine 12 after the engine rotational speed Ne has been increased by the electric motor MG. Then, the resonance rotational speed of the drive system is made relatively low in the stage after the engine rotational speed Ne has exceeded the predetermined speed value Nx. Owing to the arrangement, in process of the engine-start control operation, the engine rotational speed Ne is made difficult to pass through the resonance rotational speed of the drive system or a rotational speed region that is in vicinity of the resonance rotational speed, whereby generation of resonance of the drive system can be suppressed. Therefore, it is possible to improve startability of the engine 12 in the engine-start control operation that is executed when the vehicle 10 is in the stopped state with the starting clutch WSC being in the released state.

In the present embodiment, the case in which the input clutch C1 is placed in the released state is the case in which the automatic transmission 22 is placed in the non-driving position whereby the power is not transmittable through the automatic transmission 22. Thus, the startability of the engine 12 can be improved in the engine-start control operation that is executed when the hybrid vehicle 10 is in the stopped state with the starting clutch WSC being in the released state.

In the present embodiment, in the case in which the working fluid temperature THoil of the working fluid used for lubrication of the starting clutch WSC is not higher than the predetermined temperature value THoilf, namely, in which the viscosity of the working fluid is high, the electronic control apparatus 90 is configured to execute the resonance-avoiding engine-start control operation in which the input clutch C1 is placed in the engaged state until the engine rotational speed Ne exceeds the predetermined speed value Nx. Owing to the arrangement, when the engine-start control operation is executed with the starting clutch WSC being in the released state and with the input clutch C1 being in the released state, it is possible to suppress the resonance of the drive system which is likely to be caused when the C1 input member C1i as well as the starting clutch WSC is rotated integrally with the electric motor MG and accordingly the resonance rotational speed of the drive system is made low.

There will be described other embodiments of this invention. The same reference signs as used in the above-described first embodiment will be used in the following embodiments, to identify the functionally corresponding elements, and descriptions thereof are not provided.

Second Embodiment

In an extremely low temperature situation in which the working fluid temperature THoil is an extremely low temperature, the maximum dischargeable amount Wout of the battery 54 is made lower than in a normal temperature situation in which the working fluid temperature THoil is a normal temperature. Therefore, in case of execution of the engine-start control operation in the extremely low temperature situation in which the maximum dischargeable amount Wout of the battery 54 is low, when the engine 12 is cranked by the electric motor MG, the engine rotational speed Ne could remain in a low speed region due to insufficiency of the MG torque Tm, as compared with in the normal temperature situation. In such a case, if the resonance rotational speed of the drive system is made relatively low, the engine rotational speed Ne cannot be quickly increased due to the resonance of the drive system in process of the engine-start control operation, so that there is a risk that the start of the engine 12 could be made difficult.

Therefore, in this second embodiment, the electronic control apparatus 90 executes the resonance-avoiding engine-start control operation in a case in which the dischargeable amount Wout of the battery 54 is not larger than a predetermined value Woutf, in addition to or in place of the case in which the working fluid temperature THoil is not higher than the predetermined temperature value THoilf. The predetermined value Woutf is a predetermined threshold value for determining that, when the maximum electric power Wout is not larger than the predetermined value Woutf, the electric power outputtable from the battery 54 is so limited that the cranking torque Tcr of the electric motor MG is insufficient to increase the engine rotational speed Ne for suppressing the resonance of the drive system, which is to be generated due to the damper 20 in process of the engine-start control operation.

In this second embodiment, at step S20 shown in FIG. 4 and corresponding to function of the state determination portion 98 (at which it is determined whether the working fluid temperature THoi is the predetermined temperature value THoilf or less in the above-describe first embodiment), it is determined whether the maximum dischargeable amount Wout of the battery 54 is the predetermined value Woutf or less, in addition to or in place of whether the working fluid temperature THoi is the predetermined temperature value THoilf or less, such that an affirmative determination is made at step S20 when the maximum dischargeable amount Wout is not larger than the predetermined value Woutf and the working fluid temperature THoi is not higher than the predetermined temperature value THoilf, or such that an affirmative determination is made at step S20 when the maximum dischargeable amount Wout is not larger than the predetermined value Woutf.

As described above, in the present second embodiment, as in the above-described first embodiment, it is possible to improve the startability of the engine 12 in the engine-start control operation that is executed when the vehicle 10 is in the stopped state with the starting clutch WSC being in the released state.

Further, in the present second embodiment, in the case in which the maximum dischargeable amount Wout of the battery 54 is not larger than the predetermined value Woutf, namely, in which the cranking torque Tcr of the electric motor MG is insufficient to increase the engine rotational speed Ne for suppressing resonance of the drive system, the electronic control apparatus 90 is configured to execute the resonance-avoiding engine-start control operation in which the input clutch C1 is placed in the engaged state until the engine rotational speed Ne exceeds the predetermined speed value Nx. Owing to the arrangement, it is possible to avoid a situation in which the engine rotational speed Ne cannot be quickly increased due to the resonance of the drive system which is likely to be caused when the resonance rotational speed of the drive system is relatively low, namely, a situation in which the engine 12 is made difficult to be started.

Third Embodiment

In a cold state of the engine 12, a sliding resistance (such as a resistance acting on each piston sliding in a cylinder bore of the engine 12) when the engine 12 is driven and rotated, is increased, whereby a sliding torque is increased. As the sliding torque of the engine 12 is made larger, the engine rotational speed Ne is more likely to remain in a low speed region when the engine 12 is being cranked by the electric motor MG, or the engine rotational speed Ne is made more difficult to be smoothly increased after the initial explosion of the engine 12. In such a case, if the resonance rotational speed of the drive system is made relatively low, the engine rotational speed Ne cannot be quickly increased due to the resonance of the drive system in process of the engine-start control operation, so that there is a risk that the start of the engine 12 could be made difficult.

Therefore, in this third embodiment, the electronic control apparatus 90 executes the resonance-avoiding engine-start control operation in a case in which the engine-coolant water temperature THeng is not higher than a predetermined temperature value THengf, in addition to or in place of the case in which the working fluid temperature THoil is not higher than the predetermined temperature value THoilf. The predetermined temperature value THengf is a predetermined threshold value for determining that, when the engine-coolant water temperature THeng is not higher than the predetermined temperature value THengf, the engine-coolant water temperature THeng is so low that the sliding torque of the engine 12 upon rotation of the engine 12 is increased to such a degree that makes the engine rotational speed Ne difficult to be increased for suppressing resonance of the drive system, which is to be generated due to the damper 20 in process of the engine-start control operation.

In this third embodiment, at step S20 shown in FIG. 4 and corresponding to function of the state determination portion 98 (at which it is determined whether the working fluid temperature THoi is the predetermined temperature value THoilf or less in the above-describe first embodiment), it is determined whether the engine-coolant water temperature THeng is the predetermined temperature value THengf or less, in addition to or in place of whether the working fluid temperature THoi is the predetermined temperature value THoilf or less, such that an affirmative determination is made at step S20 when the engine-coolant water temperature THeng is not higher than the predetermined temperature value THengf and the working fluid temperature THoi is not higher than the predetermined temperature value THoilf, or such that an affirmative determination is made at step S20 when the engine-coolant water temperature THeng is not higher than the predetermined temperature value THengf.

As described above, in the present third embodiment, as in the above-described first embodiment, it is possible to improve the startability of the engine 12 in the engine-start control operation that is executed when the vehicle 10 is in the stopped state with the starting clutch WSC being in the released state.

Further, in the present third embodiment, in the case in which the engine-coolant water temperature THeng is not higher than the predetermined temperature value THengf, namely, in which the sliding torque of the engine 12 upon rotation of the engine 12 is increased to such a degree that makes the engine rotational speed Ne difficult to be increased for suppressing resonance of the drive system, the electronic control apparatus 90 is configured to execute the resonance-avoiding engine-start control operation in which the input clutch C1 is placed in the engaged state until the engine rotational speed Ne exceeds the predetermined speed value Nx. Owing to the arrangement, it is possible to avoid a situation in which the engine rotational speed Ne cannot be quickly increased due to the resonance of the drive system which is likely to be caused when the resonance rotational speed of the drive system is relatively low, namely, a situation in which the engine 12 is made difficult to be started.

Fourth Embodiment

In a case in which the engine rotational speed Ne actually remains in the low speed region when the engine 12 is being cranked by the electric motor MG, if the resonance rotational speed of the drive system is made low, there is a risk that the start of the engine 12 could be made difficult due to generation of resonance of the drive system by which the engine rotational speed Ne is impeded from being quickly increased.

Therefore, in this fourth embodiment, the electronic control apparatus 90 executes the resonance-avoiding engine-start control operation in a case in which a gradient (increase or change rate) SL of the engine rotational speed Ne increased by the cranking torque Tcr of the electric motor MG in process of the engine-start control operation, is not higher than a predetermined gradient value (predetermined rate value) SLf, in addition to or in place of the case in which the working fluid temperature THoil is not higher than the predetermined temperature value THoilf. The gradient SL of the engine rotational speed Ne is a derivative value of the engine rotational speed Ne. The predetermined gradient value SLf is a predetermined threshold value for determining that, when the gradient SL of the engine rotational speed Ne is not higher than the predetermined gradient value SLf, the gradient SL of the engine rotational speed Ne is so low that the cranking torque Tcr of the electric motor MG is estimated to be insufficient to increase the engine rotational speed Ne for suppressing the resonance of the drive system, which is to be generated due to the damper 20 in the process of the engine-start control operation.

In this fourth embodiment, at step S20 shown in FIG. 4 and corresponding to function of the state determination portion 98 (at which it is determined whether the working fluid temperature THoi is the predetermined temperature value THoilf or less in the above-describe first embodiment), it is determined whether the gradient SL of the engine rotational speed Ne is the predetermined gradient value SLf or less, in addition to or in place of whether the working fluid temperature THoi is the predetermined temperature value THoilf or less, such that an affirmative determination is made at step S20 when the gradient SL of the engine rotational speed Ne is not higher than the predetermined gradient value SLf and the working fluid temperature THoi is not higher than the predetermined temperature value THoilf, or such that an affirmative determination is made at step S20 when the gradient SL of the engine rotational speed Ne is not higher than the predetermined gradient value SLf.

As described above, in the present fourth embodiment, as in the above-described first embodiment, it is possible to improve the startability of the engine 12 in the engine-start control operation that is executed when the vehicle 10 is in the stopped state with the starting clutch WSC being in the released state.

Further, in the present fourth embodiment, in the case in which the gradient (change rate) SL of the engine rotational speed Ne is not higher than the predetermined gradient value (predetermined rate value) SLf in process of the engine-start control operation, namely, in which the gradient SL of the engine rotational speed Ne is so low that the cranking torque Tcr of the electric motor MG is estimated to be insufficient to increase the engine rotational speed Ne for suppressing resonance of the drive system, the electronic control apparatus 90 is configured to execute the resonance-avoiding engine-start control operation in which the input clutch C1 is placed in the engaged state until the engine rotational speed Ne exceeds the predetermined speed value Nx. Owing to the arrangement, it is possible to avoid a situation in which the engine rotational speed Ne cannot be quickly increased due to the resonance of the drive system which is likely to be caused when the resonance rotational speed of the drive system is relatively low, namely, a situation in which the engine 12 is made difficult to be started.

While the preferred embodiments of this invention have been described in detail by reference to the drawings, it is to be understood that the invention may be otherwise embodied.

For example, in the above-described embodiment, in the case in which the input clutch C1 is in the released state when the engine-start control operation is executed with the vehicle 10 being in the stopped state and with the starting clutch WSC being in the released state, the resonance-avoiding engine-start control operation is started after the input clutch C1 has been switched from the released state to the engaged state. However, this arrangement is not essential. For example, the input clutch C1 may be switched to the engaged state while the engine 12 is being cranked by the electric motor MG after the start of the resonance-avoiding engine-start control operation, as long as the switching of the input clutch C1 to the engaged state is completed before the engine rotational speed is increased to a value in vicinity of the second resonance rotational speed N2.

In the above-described embodiments, as the automatic transmission constituting a part of the power transmission path between the engine 12 and the drive wheels 14, there has been described, by way of example, the planetary-gear type automatic transmission 22 that is configured to establish a selected one of the gear positions consisting of a plurality of forward-driving gear positions and a reverse-driving gear position. However, the automatic transmission 22 may be any step-variable transmission configured to establish a selected one of a plurality of gear positions with corresponding ones of a plurality of engagement devices being engaged. Further, the automatic transmission constituting a part of the power transmission path between the engine 12 and the drive wheels 14 may be also a known belt-type continuously variable transmission, for example. Where the automatic transmission includes a belt-type continuously variable transmission, the input clutch connected to the input rotary member of the automatic transmission may be, for example, a forward drive clutch or a reverse drive brake included in a known forward/reverse switching device that cooperates with the belt-type continuously variable transmission to constitute the automatic transmission. It is noted that the belt-type continuously variable transmission is broadly interpreted to conceptually encompass a chain-type continuously variable transmission.

Further, the arrangements in the above-described second, third and fourth embodiments may be combined as needed.

It is to be understood that the embodiments described above are given for illustrative purpose only, and that the present invention may be embodied with various modifications and improvements which may occur to those skilled in the art.

NOMENCLATURE OF ELEMENTS

10: hybrid vehicle
12: engine
14: drive wheels
20: damper
22: automatic transmission
38: transmission input shaft (input rotary member)
54: battery (electric storage device)
90: electronic control apparatus (control apparatus)
C1: input clutch
C1i: C1 input member (input-side member of input clutch)
K0: connecting/disconnecting clutch
WSC: starting clutch
WSCi: WSC input member (input-side member of starting clutch)
WSCo: WSC output member (output-side member of starting clutch)
MG: electric motor
COOL: coolant water
OIL: working fluid

What is claimed is:
1. A hybrid vehicle comprising:
an engine;
drive wheels;
an electric motor connected to a power transmission path between the engine and the drive wheels, in a power transmittable manner;
a connecting/disconnecting clutch disposed in the power transmission path, and configured, when being in a released state, to cut off connection between the engine and the electric motor;
a damper disposed between the engine and the connecting/disconnecting clutch in the power transmission path;
an automatic transmission constituting a part of the power transmission path, and including an input rotary member and an input clutch connected to the input rotary member;

a control apparatus configured to execute an engine-start control operation for starting the engine so as to cause the engine to be self-rotated, by igniting the engine after increasing a rotational speed of the engine by causing the electric motor to output a torque while controlling the connecting/disconnecting clutch to place the connecting/disconnecting clutch into an engaged state; and a wet starting clutch disposed between the electric motor and the automatic transmission in the power transmission path, wherein, in process of the engine-start control operation that is executed when the hybrid vehicle is in a stopped state with the starting clutch being in a released state, the control apparatus is configured to place the input clutch in an engaged state until the rotational speed of the engine exceeds a predetermined speed value, and to switch the input clutch to a released state after the rotational speed of the engine has exceeded the predetermined speed value.

2. The hybrid vehicle according to claim 1, wherein the predetermined speed value is an average speed value between a first resonance rotational speed and a second resonance rotational speed, or a speed value in vicinity of the average speed value, wherein the first resonance rotational speed is a resonance rotational speed of a drive system including the damper in a state in which an input-side member of the starting clutch connected to the electric motor is rotated integrally with the electric motor, and wherein the second resonance rotational speed is lower than the first resonance rotational speed, and is the resonance rotational speed of the drive system in a state in which an input-side member of the input clutch as well as the starting clutch is rotated integrally with the electric motor.

3. The hybrid vehicle according to claim 1, wherein the input clutch a wet frictional engagement device, and wherein the starting clutch and the input clutch are constructed such that a drag torque of the starting clutch in the released state of the starting clutch is larger than a drag torque of the input clutch in the released state of the input clutch.

4. The hybrid vehicle according to claim 1, wherein, in a case in which the input clutch is placed in the released state when the engine-start control operation is executed with the hybrid vehicle being in the stopped state and with the starting clutch being in the released state, the control apparatus is configured to start execution of the engine-start control operation after switching the input clutch to the engaged state, and to cause the engine to be self-rotated, by igniting the engine after increasing the rotational speed of the engine, by the electric motor, to a predetermined starting speed value that is lower than the predetermined speed value, and then switch the input clutch to the released state when the rotational speed of the engine has exceeded the predetermined speed value.

5. The hybrid vehicle according to claim 4, wherein the case in which the input clutch is placed in the released state is a case in which the automatic transmission is placed in a non-driving position whereby a power is not transmittable through the automatic transmission.

6. The hybrid vehicle according to claim 1, wherein, in a case in which a temperature of a working fluid used for lubrication of the starting clutch is not higher than a predetermined temperature value, the control apparatus is configured to execute the engine-start control operation in which the input clutch is placed in the engaged state until the rotational speed of the engine exceeds the predetermined speed value, and wherein the predetermined temperature value is a predetermined threshold value for determining that, when the temperature of the working fluid is not higher than the predetermined temperature value, the temperature of the working fluid is so low that a viscosity of the working fluid is increased to such a degree that an output-side member of the starting clutch is to be rotated together with the input-side member of the starting clutch, with the starting clutch being in the released state and with the input clutch being in the released state.

7. The hybrid vehicle according to claim 1, further comprising an electric storage device configured to supply and receive an electric power to and from the electric motor, wherein, in a case in which a maximum electric power that is outputtable from the electric storage device is not larger than a predetermined value, the control apparatus is configured to execute the engine-start control operation in which the input clutch is placed in the engaged state until the rotational speed of the engine exceeds the predetermined speed value, and wherein the predetermined value is a predetermined threshold value for determining that, when the maximum electric power is not larger than the predetermined value, the electric power outputtable from the electric storage device is so limited that an output torque of the electric motor is insufficient to increase the rotational speed of the engine for suppressing resonance of a drive system including the damper, which is to be generated due to the damper in process of the engine-start control operation.

8. The hybrid vehicle according to claim 1, wherein, in a case in which a temperature of a coolant water of the engine is not higher than a predetermined temperature value, the control apparatus is configured to execute the engine-start control operation in which the input clutch is placed in the engaged state until the rotational speed of the engine exceeds the predetermined speed value, and wherein the predetermined temperature value is a predetermined threshold value for determining that, when the temperature of the coolant water is not higher than the predetermined temperature value, the temperature of the working fluid is so low that a sliding torque of the engine upon rotation of the engine is increased to such a degree that makes the rotational speed of the engine difficult to be increased for suppressing resonance of a drive system including the damper, which is to be generated due to the damper in process of the engine-start control operation.

9. The hybrid vehicle according to claim 1, wherein, in a case in which a change rate of the rotational speed of the engine is not higher than a predetermined rate value in process of the engine-start control operation, the control apparatus is configured to place the input clutch in the engaged state until the rotational speed of the engine exceeds the predetermined speed value, and wherein the predetermined rate value is a predetermined threshold value for determining that, when the change rate of the rotational speed of the engine is not higher than the predetermined rate value, the change rate of the rotational speed of the engine is so low that an output torque of the electric motor is estimated to be insufficient to increase the rotational speed of the engine for suppressing resonance of a drive system including the damper, which is to be generated due to the damper in the process of the engine-start control operation.

* * * * *